United States Patent [19]

Furuhata et al.

[11] Patent Number: 4,843,493
[45] Date of Patent: Jun. 27, 1989

[54] ROTARY HEAD TYPE MAGNETIC RECORDING AND REPRODUCING APPARATUS AND METHOD OF PRODUCING TRACKING CONTROL SIGNALS THEREFOR

[75] Inventors: Takashi Furuhata; Yasufumi Yumde; Fujio Okamura; Takaharu Noguchi; Toshifumi Shibuya, all of Yokohama; Katsuo Mohri, Yokosuka; Takao Arai, Yokohama; Toshimichi Terada, Chigasaki, all of Japan

[73] Assignee: Hitachi, Ltd., Tokyo, Japan

[21] Appl. No.: 838,958

[22] Filed: Mar. 12, 1986

Related U.S. Application Data

[63] Continuation of Ser. No. 659,695, Oct. 11, 1984, abandoned.

[30] Foreign Application Priority Data

| Oct. 14, 1983 | [JP] | Japan | 58-190766 |
| Nov. 9, 1983 | [JP] | Japan | 58-209085 |
| Nov. 9, 1983 | [JP] | Japan | 58-209087 |
| Dec. 2, 1983 | [JP] | Japan | 58-226875 |

[51] Int. Cl.$^4$ .............................. G11B 5/584
[52] U.S. Cl. .................... 360/77.15; 360/18; 360/27
[58] Field of Search ............... 360/77, 75, 27, 73, 360/18, 70, 32

[56] References Cited

U.S. PATENT DOCUMENTS

| 4,528,605 | 7/1985 | Hiraguri | 360/77 |
| 4,558,382 | 12/1985 | Edakubo et al. | 360/77 |
| 4,566,045 | 1/1986 | Weissensteiner | 360/77 |
| 4,573,089 | 2/1986 | Maeda et al. | 360/70 |
| 4,602,298 | 7/1980 | Nishitani et al. | 360/70 |

FOREIGN PATENT DOCUMENTS

| 0113986 | 7/1984 | European Pat. Off. | 360/27 |
| 0117753 | 9/1984 | European Pat. Off. | 360/77 |
| 54-21809 | 2/1979 | Japan | 360/77 |
| 56-68923 | 6/1981 | Japan | 360/27 |

*Primary Examiner*—Alan Faber
*Assistant Examiner*—Steven R. Garland
*Attorney, Agent, or Firm*—Antonelli, Terry & Wands

[57] ABSTRACT

A method of producing a tracking control signal in a rotary head type magnetic recording and reproducing apparatus and a rotary head type magnetic recording and reproducing apparatus capable of a proper tracking by the use of the tracking control signal. First and second tracking signals are recorded on local portions of each odd-numbered track and the first tracking signal and a third tracking signal are recorded on local portions of each even-numbered track in such a manner that the second tracking signals on two odd-numbered track adjacent to any one even-numbered track are not overlapped with each other and the third tracking signals on two even-numbered tracks adjacent to any one odd-numbered track are not overlapped with each other when viewed in a direction perpendicular to the longitudinal direction of the tracks; upon scanning of a track crosstalk signals are detected from two adjacent track simultaneously with reproduction of the first and second or third tracking signals; and the detected crosstalk signals are compared by the use of timing of the reproduction of the first tracking signal for each track thereby producing a tracking control signal. The second tracking signal may have a frequency equal to that of the third tracking frequency.

25 Claims, 21 Drawing Sheets

ROTARY HEAD TYPE MAGNETIC RECORDING AND REPRODUCING APPARATUS AND METHOD OF PRODUCING TRACKING CONTROL SIGNALS THEREFOR

This a continuation of application Ser. No. 659,695, filed Oct. 11, 1984, now abandoned.

The present invention relates to a rotary head type magnetic recording and reproducing apparatus and a method of producing tracking control signals therefor.

In a method generally used for tracking control to correctly scan the track formed by recording in magnetic tape with a rotary head of a conventional rotary head type magnetic recording and reproducing apparatus such as helical-scan VTR, the rotary phase of the rotary head or the travelling phase of the magnetic tape is regulated with reference to a control signal recorded in the control track formed at the end of the magnetic tape.

This conventional method using the control signal, however, requires that the relative positions of the control head and the rotary heads for recording and reproducing the control signal be the same for all apparatuses. If they are different from each other, correct tracking would become impossible and compatible reproduction would become difficult thereby to adversely affect the reliability of the apparatuses involved.

An alternative tracking control method conventionally suggested to improve this problem is such that instead of the conventional control signal, a control signal of a type of what is called a "pilot signal" is recorded by frequency multiplication on a signal such as a video signal to be recorded, and the tape travel speed is controlled to substantially equalize the crosstalks of the pilot signals reproduced from adjacent tracks at the time of reproduction.

A well-known method uses such pilot signals of one frequency, two frequencies, three frequencies or four frequencies for the tracking control.

In one well-known method using the pilot signals of one frequency, such as disclosed in Japanese Patent Publication No. 20621/81, a plurality of pilot signals are recorded in the longitudinal direction of the tracks in a manner not to be adjacently located to each other in the direction perpendicular to the longitudinal direction of the tracks, as seen from FIG. 1. In FIG. 1, character H is assumed to be a horizontal scanning unit of the video signal. With displacement between track ends being as much as 1.5H, pilot signals a, b are recorded at the hatched positions of the tracks A and B in an "H-alignment", in which the recording positions of horizontal sync signals are aligned between adjacent tracks in the direction perpendicular to the longitudinal direction of the tracks (hereinafter called the "H-alignment"). In the case where the head scans the track $B_1$ at the time of reproduction, for instance, the quantity of the crosstalk of the pilot $a_{21}$ reproduced from the adjacent track $A_2$ and that of the pilot $a_{12}$ reproduced from the adjacent track $A_1$ are detected on the basis of the pilot $b_{11}$ so that tracking control is effected to equalize the crosstalks from these two pilot signals. In the case where the next track $A_2$ is scanned by the head, on the other hand, the quantity of crosstalk of the pilot $b_{21}$ reproduced from the adjacent track $B_2$ and that of the pilot $b_{13}$ reproduced from the adjacent track $B_1$ are detected on the basis of the reproduction of the pilots $a_{22}$, so that the tracking is controlled in a manner to equalize these two quantities of crosstalks.

In this well-known apparatus of FIG. 1, it is a basic requirement that signals be in the "H-alignment" between adjacent tracks. The recording period $T_A$ of the pilot signals required for obtaining at least a piece of tracking error information from the scanning start point (shown by S in the diagram) of each track reaches the maximum when scanning the track $A_2$ as apparent from the explanation about operation made above, and is given by $$T_A = 7.5H \tag{1}$$

The period $T_E$ for obtaining the tracking error information for each detection of the quantities of crosstalks of adjacent tracks, on the other hand, is expressed by $$T_E = 1.0H \tag{2}$$

In the well-known example shown in FIG. 1, as clear from the foregoing description, the pattern of detection of tracking error data from adjacent tracks each time of track scanning is exactly the same for tracks A and B (specifically each process of detection of crosstalks starts, for example, from the lower track and proceeds to the upper track in the same timing of tracking error data detection for tracks A and B), and therefore, the operation is liable to settle undesirably in what is called "inverted tracking" (in which the head A scans the track B, while the head B scans the track A.). In order to overcome this problem, there must be provided some measure for discrimination of tracks A and B from each other.

Japanese Patent Application Laid-Open No. 3507/79, on the other hand, discloses a method using pilot signals of two frequencies, in which as shown in FIG. 2, the pilot signals of two frequencies $f_1$, $f_2$ are recorded together at longitudinal intervals of 2H by being staggered by 1H between adjacent tracks. In FIG. 2, the displacement at the track end is 1.5H as in FIG. 1, and the pilot signals are staggered by H from each other between adjacent tracks in the direction perpendicular to the longitudinal direction, so that the pilot signals $f_1$ are recorded in the hatched portions of tracks A and B, and the pilot signals $f_2$ in the blank portions. At the time of reproduction by the head scanning the track $B_1$, for example, the quantity of crosstalk of the pilot signal $f_1$ reproduced from a of the adjacent track $A_1$ and that of the pilot signal $f_1$ reproduced from d of the adjacent track $A_2$ are detected on the basis of the pilot signal $f_2$ reproduced from the portions b and c, and the tracking is controlled in such a manner as to equalize these two quantities of crosstalks. In the event that the next track $A_2$ is scanned by the head, on the other hand, the pilot signals $f_1$ reproduced from portions d and e are used to detect the quantity of crosstalk of the pilot signal $f_2$ reproduced from c of the adjacent track $B_1$ and that of the pilot signal f of the adjacent track $B_2$ thereby to control the tracking operation in a manner to equalize these quantities.

In this well-known example of FIG. 2, as in the case of FIG. 1, the H-alignment of horizontal scanning units between adjacent tracks is the basic requirement, and the pilot signal recording period $T_A$ necessary for obtaining at least one piece of tracking error data from the scanning start point of each track (shown by S in the diagram) is maximum in the case of scanning the track B₁ and is given as $$T_A = 6.0H \tag{3}$$

The period $T_E$ necessary for obtaining the tracking error data for each detection of crosstalks, on the other hand, is expressed as $$T_A = 1.0H \tag{4}$$

In this prior art apparatus, two-frequency pilot signals are recorded at regular intervals on each track, and therefore it is impossible to identify track A or B under scanning even by such a method of discrimination in which the pilot signal $f_2$ from the adjacent track is considered for the track A and the pilot signal $f_1$ from the adjacent track is given attention for the track B, with a result that the operation settles in the inverted tracking as in the prior art apparatus shown in FIG. 1, thereby leaving the problem of track identification unsolved.

A method using three-frequency pilot signals is disclosed in Japanese Patent Publication No. 20622/81, in which as shown in FIG. 3, three-frequency pilot signals $f_1$, $f_2$ and $f_3$ are continuously recorded on a cycle of three tracks.

This conventional method, which also posses the problem of the operation settling in the inverted tracking as in the methods of FIGS. 1 and 2 due to the cyclical recording of three frequencies, is accompanied by the requirement of track identification.

Also, Japanese Patent Application Laid-Open No. 116120/78 (corresponding to U.S. Pat. No. 4,297,733, U.K. Patent No. 1,571,874 and DT-OS No. 2,809,402) discloses a method using pilot signals of four frequencies, in which as shown in FIG. 4, pilot signals of four frequencies $f_1$, $f_2$, $f_3$ and $f_4$ are continuously recorded in sequence on a cycle of four tracks. In all these methods, the tracking control is effected in such a manner as to equalize the quantities of crosstalks of pilot signals of different frequencies reproduced from adjacent tracks.

In all the well-known methods described with reference to FIGS. 1 to 4, the pilot signals are recorded with video signals by frequency multiplication, and therefore a spurious signal such as beat interference is generated, or in the case where the main signal to be recorded is a digitally-coded PCM signal, confusion with the pilot signals causes a coding error, resulting in a spurious signal. In order to alleviate this basic problem, the recording level of the pilot signals is unavoidably reduced to a level sufficiently low as compared with that of the video (main) signal. This causes a substantial reduction in the recording speed of the main signal on the one hand, and fails to attain a sufficient S/N (signal-to-noise) ratio of reproduced pilot signals on the other hand, thus making stable tracking control difficult which in turn leads to the problem that it is impossible to make full use of the advantage of the capability of detection of tracking error data in continuous manner or with short time intervals along the track length.

Further, the conventional methods of FIGS. 1 and 2, in which the H-alignment of adjacent tracks must be secured, are subject to a great limitation for application to a magnetic recording and reproducing apparatus.

Accordingly, it is an object of the present invention to provide a magnetic recording and reproducing apparatus and a method of producing tracking control signals therefor, in which all the limiting factors such as the H-alignment between adjacent tracks in the prior art are eliminated, and at the same time, the recording areas for pilot signals used for tracking control are minimized to attain a sufficient S/N (signal-to-noise) ratio, thereby making stable tracking control possible and to provided method of producing a tracking control signal therefor.

In accordance with one aspect of the present invention, a method of producing a tracking control signal includes the following features. Three tracking signals are recorded on at least part of parallel, oblique tracks of a magnetic tape by magnetic heads. First and second tracking signals are recorded on first and second portions of each odd-numbered track and the first tracking signal and a third tracking signal are recorded on first and second portions of each even-numbered track by the heads. At least part of the first portion of each track is not farther from the track scanning start ends than at least part of each of the second portions of the two adjacent tracks as viewed in a direction perpendicular to the longitudinal direction of the tracks. By scanning odd-numbered tracks by the heads, recorded first tracking signal and crosstalk signals of recorded third tracking signal from the two adjacent even-numbered tracks are reproduced, and by scanning even-numbered tracks by the heads, recorded first tracking signal and crosstalk signals of recorded second tracking signal from the two adjacent odd-numbered tracks are reproduced. The levels of the two crosstalk signals of each of the second and third tracking signals reproduced by the reproduction scanning of the tracks are compared with timing in a timed relation with the reproduction of the first tracking signal to provide a tracking control signal. The frequencies of the second and third tracking signals may be equal to each other.

In accordance with another aspect of the present invention, a rotary head type magnetic recording and reproducing apparatus having a plurality of rotary heads includes the following features. A head position signal generating means generates, in synchronism with rotation of the rotary heads, a head position signal containing a plurality of scanning start pulses each representative of the time point when one of the heads is located when at the scanning start end of one of the tracks. Means is connected with the head position signal generating means for generating two first gate pulse signals for odd-numbered and even-numbered tracks starting upon elapse of first and second time periods from respective scanning start pulses. Means is connected with the first gate pulse signal generating means for generating a second gate pulse signal for odd-numbered tracks in a first timed relation with the associated one of the first gate pulse signals and for generating a third gate pulse signal for even-numbered tracks in a second timed relation with the other first gate pulse signal under control of the head position signal. There is provided signal source means capable of at least two different frequencies, the outputs of which are successively and cyclically delivered through selection means controlled by the first, second and third gate pulse signals and are fed via signal processing means to the heads so that the heads scan the odd-numbered and even-numbered tracks successively to record the three signals as tracking signals on the tracks. The reproduction output from the signal processing means provided as a result of a reproduction scanning of the tracks by the heads is supplied to a tracking control circuit means the output of which is a tracking control signal to be fed to tape drive means or head carrying means driving means. This tracking control circuit means includes means for extracting a reproduced first tracking signal for each track from the reproduction output, means for alternately producing first and second crosstalk detection signals from even-numbered tracks and third and fourth crosstalk detection signals from odd-numbered tracks on the basis of the crosstalks contained in the reproduction output, means connected with the reproduced first tracking signal generating means for generating a sampling signal on the basis of the reproduced first tracking signal, and comparing means for comparing the first and second crosstalk detection signals and comparing the third and fourth detection signals by the use of the sampling signal.

Further, blanking signals may be recorded in those portions of each track which are adjacent to the above-mentioned tracking signals. Furthermore, portions or regions are locally alloted for effective recording and reproduction of only tracking signals in each track, whereby a sufficient recording level of the tracking signal in the tracking control signal is attained, to secure a satisfactory S/N ratio.

Figure 1:
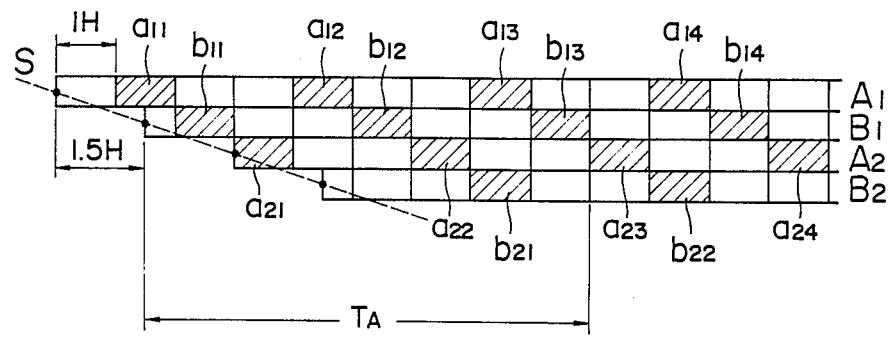
FIGS. 1, 2, 3 and 4 show patterns of conventional tracks.
Figure 2:
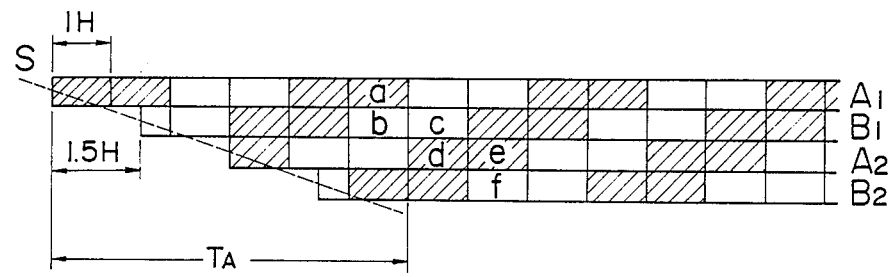
Figure 3:
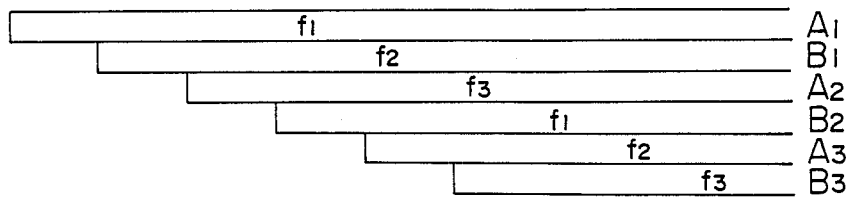
Figure 4:
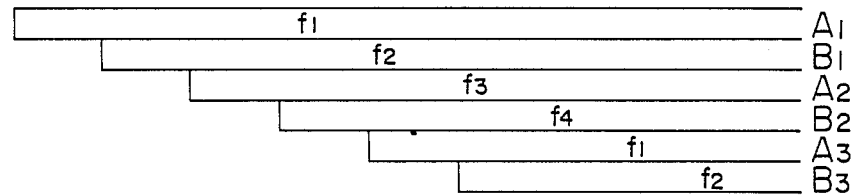
Figure 5:
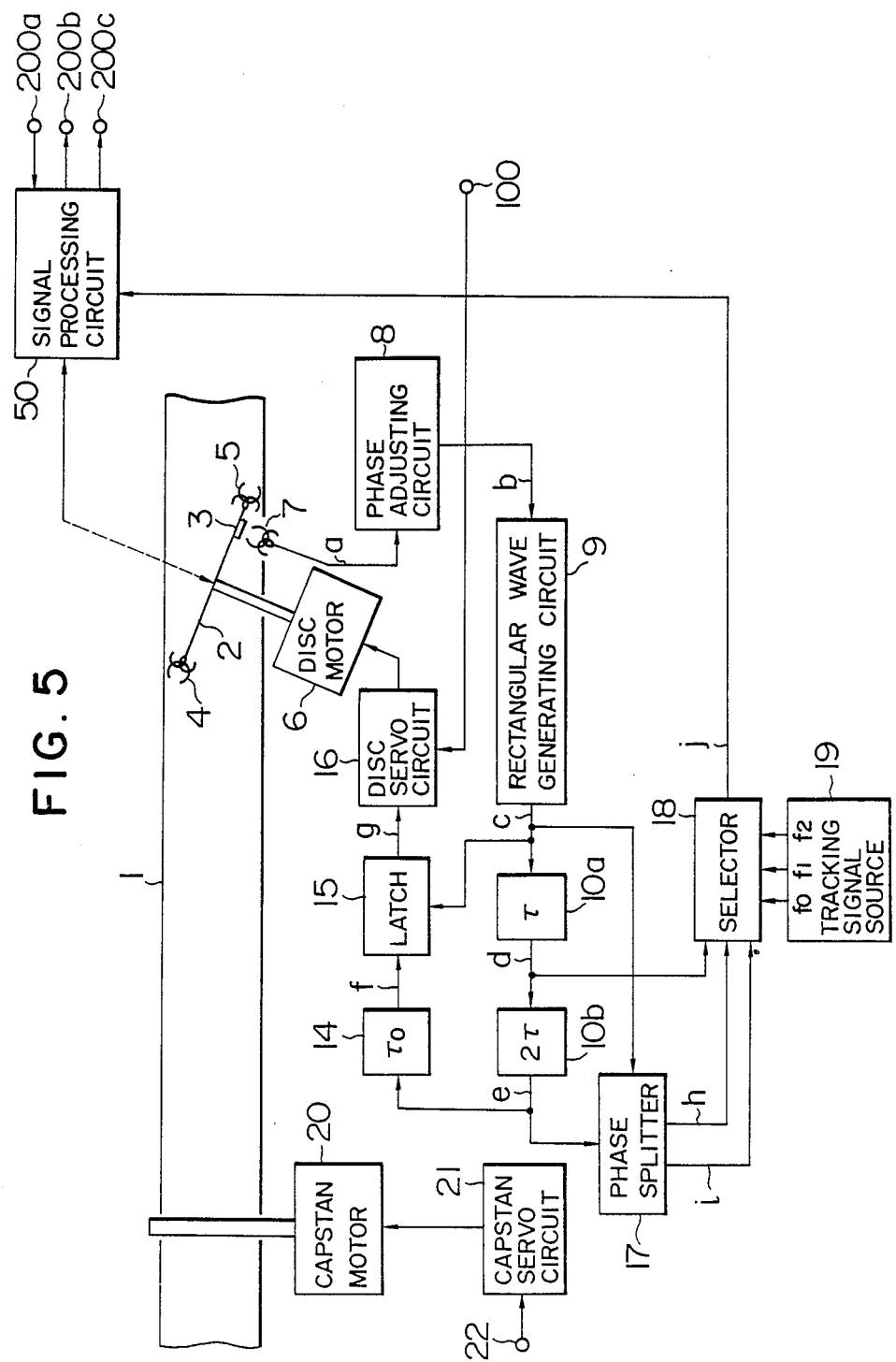
FIG. 5 is a diagram showing a recording servo control in an embodiment of the present invention.
Figure 6:
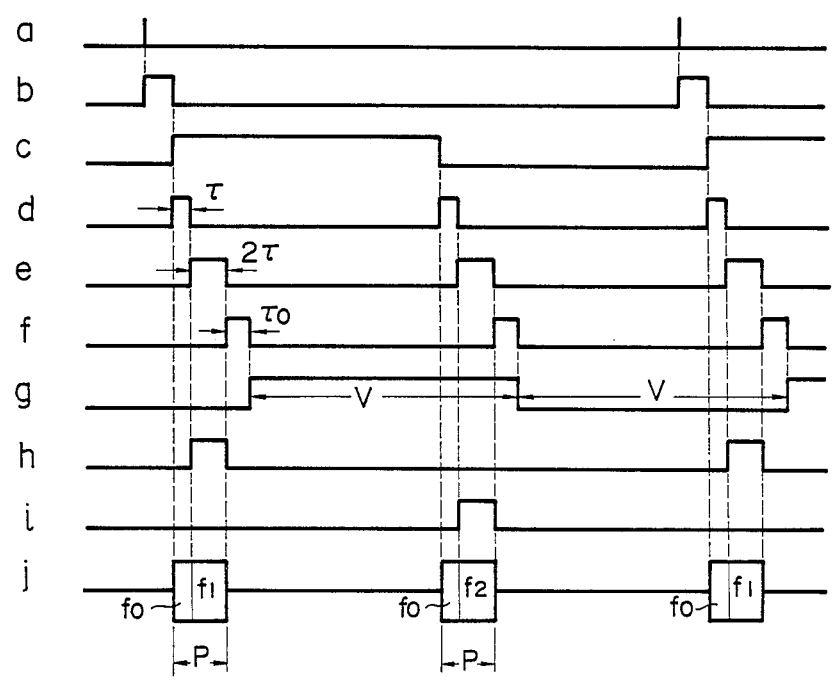
FIG. 6 shows waveforms produced at various parts in FIG. 5.
Figure 7:
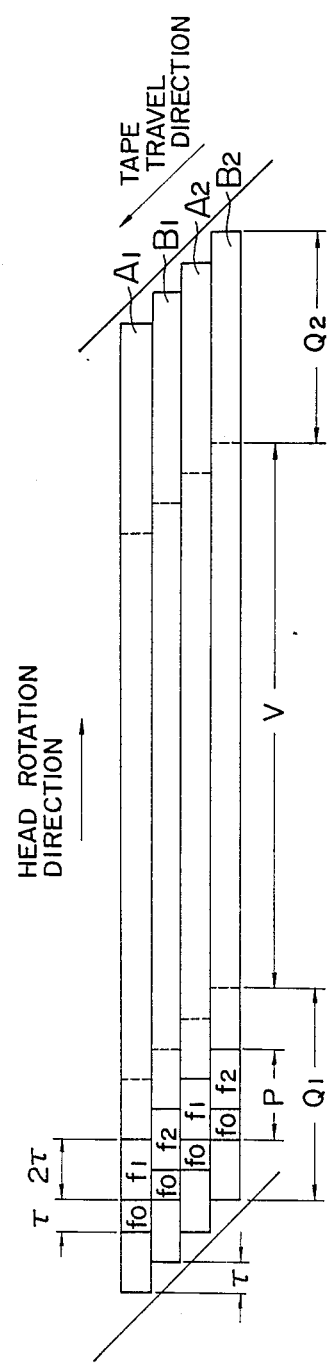
FIG. 7 is a diagram showing a tape pattern for FIG. 5.
Figure 8:
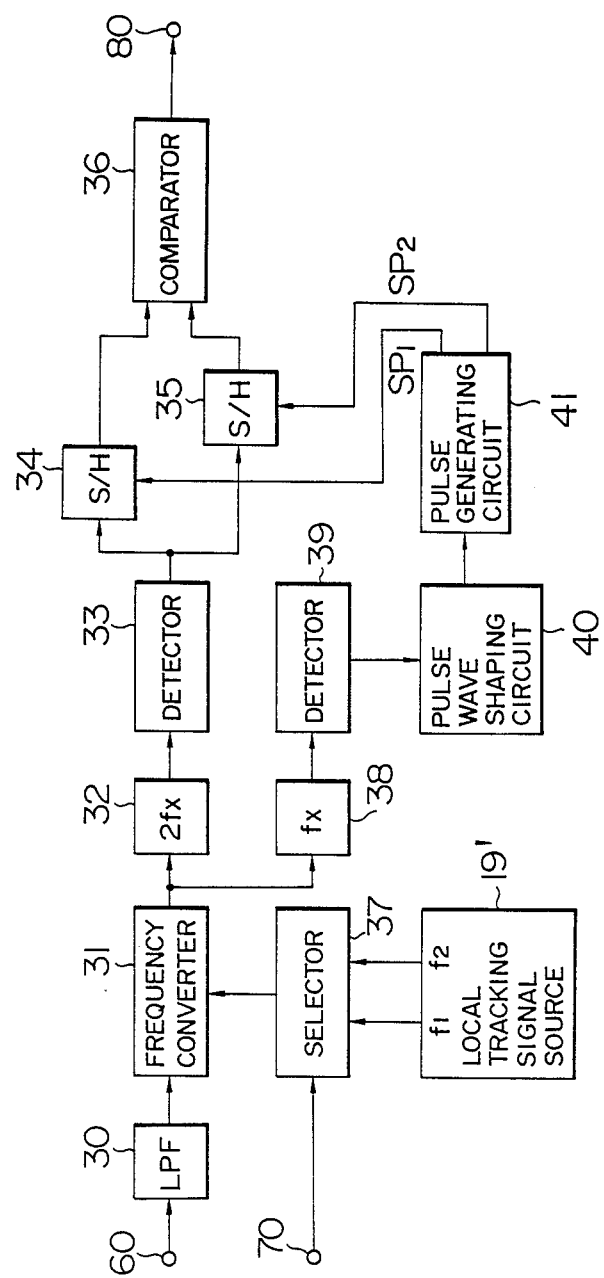
FIG. 8 is a diagram showing a tracking control in an embodiment of the present invention.
Figure 9A:
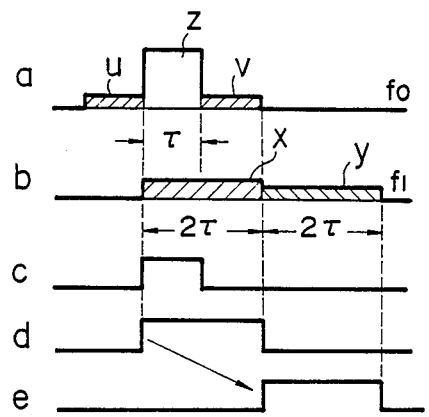
FIGS. 9A, 9B and 10 are waveforms produced at various parts in FIG. 8.
Figure 9B:
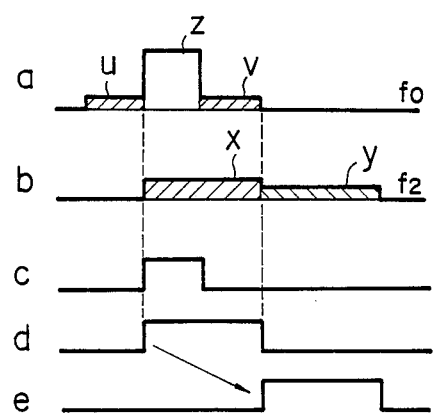

The present invention will be explained in detail below with reference to the embodiments. FIG. 5 is a diagram showing a servo control for recording used for a rotary head type helical scan VTR according to the present invention. FIG. 6 is a diagram for explaining the operation of the same control. FIG. 7 is a diagram showing a track pattern recorded and formed with the same control. FIG. 8 is a diagram showing the tracking control for reproduction. FIG. 9 is a diagram showing waveforms produced at various parts of the same control for explaining the operation thereof.

In FIG. 5, a magnetic tape 1 is driven by a capstan motor 20, which in turn is controlled to rotate at constant speed by a capstan servo circuit 21. Rotary magnetic heads 4, 5 are mounted at an angle of 180 degrees to each other on a disc 2, and rotated with the disc 2 by a disc motor 6. The tape 1 is wound on the disc 2 by an amount slightly larger than 180 degrees, and therefore, an overlapped portion is formed as shown by Q1 and Q2 on the tracks in FIG. 7. A magnet 3 is mounted on the disc 2 and is detected by a tachometer head 7 to obtained a pulse (a of FIG. 6) in synchronism with the rotation of the magnetic heads 4, 5 from the head 7. This pulse from the head 7 is applied to a circuit 8 where it is phase-adjusted in such a manner that the magnetic heads 4, 5 are in predetermined positional relation with the tape 1. And after that, the output of the circuit 8 (b of FIG. 6) is applied to a rectangular wave generating circuit 9. This circuit 9 produces a pulse c (c of FIG. 6) with duty factor of 50% synchronous with the rotation of the magnetic heads 4, 5.

Numeral 10a designates a delay circuit constituted by e.g., a multivibrator, which is triggered at the edges of rise and fall of the pulse c from the circuit 9, and a pulse d of the time duration $\tau$ corresponding to a displacement distance between adjacent oblique tracks at the track ends as mentioned later. The pulse e (e of FIG. 6) with a time duration of $2\tau$ is produced at the delay circuit 10b constituted, e.g., a multivibrator by being triggered at the fall of the pulse d from the circuit 10a. Further, a delay circuit 14 constituted, e.g., a multivibrator produces a pulse ' f (f of FIG. 6) with predetermined time duration $\tau_0$ by being triggered at the fall of the pulse e from the circuit 10b. Numeral 15 designates a latch circuit for latching the pulse c from the circuit 9 at the fall of the pulse f from the circuit 14 and thus producing a pulse g (g of FIG. 6) delayed by the time length of $\tau + 2\tau + \tau_0$ from the pulse c produced from the circuit 9. The pulse g produced from the circuit 15 is applied to one input terminal of a disc servo circuit 16, and the other input terminal thereof is supplied with a vertical sync signal of the frame period of the video signal (e.g., from a video camera) to be recorded from the terminal 100 as a reference signal for the disc servo system for recording. At this disc servo circuit 16, the pulse g from the circuit 15 is compared with the reference signal from the terminal 100, and in accordance with the phase difference between them, a phase error signal is produced from the circuit 16 and supplied to the disc motor 6. As a result, the disc motor 6 is subjected to servo control in such a manner that the pulse g is in phase with the reference signal, so that the magnetic heads 4, 5 are rotated at a velocity equal to the frame frequency.

Numeral 50 designates a video signal processing circuit which is supplied with a video signal to be recorded from a terminal 200a, which signal is, after having been appropriately processed at the circuit 50, densely recorded without guard band on the tracks A and B of FIG. 7 respectively by the magnetic heads 4 and 5 on the basis of the servo control.

Numeral 17 designates a phase splitter for dividing the pulse e from the circuit 10b into two phases by the pulse c from the circuit 9, so that the pulse h (h of FIG. 6) and the pulse i (i of FIG. 6) are produced alternately during the "high" and "low" periods of the pulse c, respectively. Numeral 19 designates a tracking control signal source for generating tracking signals of at least two different frequencies, in this embodiment, three tracking signals of three different frequencies $f_0$, $f_1$, $f_2$ As mentioned above, these tracking signals are signals contributing to the generation of tracking error signals, and the frequency of the tracking signals is determined by use of a given frequency $f_x$ as follows:

$$\left. \begin{array}{l} f_1 = f_0 - f_x \\ f_2 = f_0 + f_x \end{array} \right\} \quad (5)$$

Numeral 18 designates a tracking signal selector circuit, in which a pilot signal $f_0$ is selected only during the pulse width $\tau$ in response to the pulse d from the circuit 10a pilot signal $f_1$ is selected only during the pulse width $2\tau$ in response to the pulse h from the circuit 17, and a pilot signal $f_2$ is selected only during the pulse width $2\tau$ in response to the pulse i. Therefore, during the period when the pulse c is "high" (pulse g is "low"), the tracking signals $f_0$ and $f_1$ are produced in that order, and during the period when the pulse c is "low" (the pulse g is "high"), the tracking signals $f_0$ and $f_2$ are produced in that order, from the output terminal of the circuit 18, as shown by j of FIG. 6. The tracking signals from the circuit 18 are applied through the video signal processing circuit 50 and recorded, together with the video signal, on the magnetic heads 4 and 5 alternately.

FIG. 7 shows a track pattern recorded and formed by the above-described recording servo control unit. In this drawing, characters $Q_1$ and $Q_2$ designate overlapped portions formed by winding the tape 1 excessively more than 180 degrees on the disc 2, and the tracking signals are recorded in the regions shown by P of the overlapped portion $Q_1$. Character V designates a recording region for the video signal formed by winding of 180 degrees. The video signal is recorded also in the overlapped portions $Q_1$ and $Q_2$ other than the region V. In this case, therefore, the tracking signals may be recorded by frequency multiplication together with the video signal. As described later, the video signals at these overlapped portions are eliminated at the time of reproduction, and therefore, even if the recording level of the tracking signal is raised, the reproduced video signal is not deteriorated, which means that the recording regions of the tracking signal and the main signal thus effectively separated. For complete separation thereof, the recording of the video signal is temporarily stopped in the region P, as will be easily understood. The present embodiment is applied with equal effect to the case in which signals (e.g., PCM audio signal) other than the main signal (e.g., video signal) are recorded in the region P or the region P and adjacent regions.

In FIG. 7, the displacement distance of adjacent tracks at the track end (corresponding time duration $\tau$ in the drawing) is determined in accordance with the rotational speed of the rotary heads 4, 5 and the driving speed of the tape 1, and is given as the length of time $\tau$ for scanning the rotary heads. On the other hand, as mentioned with reference to FIG. 6, the tracking signal $f_0$ is recorded only during a time period identical with the displacement distance, while the tracking signals $f_1$ and $f_2$ are recorded during the time $2\tau$ identical with a length twice the displacement distance following the tracking signal $f_0$. As a result, as shown in FIG. 7, the recording start point of the tracking signal $f_1$ or $f_2$ on the track coincides with that of the tracking signal $f_0$ on the adjacent track, while the recording end point of the tracking signal $f_1$ or $f_2$ coincides with that of the tracking signal $f_1$ or $f_2$ on the track next but one track.

FIG. 8 is a diagram showing a tracking control for reproduction by the use of the above-mentioned tracking signals, and the operation of this control will be explained with reference to the waveforms shown in FIG. 9. The servo control for reproduction, which is not shown, may utilize most of the servo control for recording shown in FIG. 5, except for the differences that the circuits 17, 18 are not used, that the terminal 100 is supplied with a predetermined reference signal of frame period instead of the vertical sync signal of frame period, that the tracking error signal i.e., the tracking control signal, from the tracking control unit of FIG. 8 mentioned later is applied to the terminal 22 whereby the capstan motor 20 is controlled via the capstan servo circuit 21, and that the video signal processing circuit 50 produces the video signal and the tracking signals reproduced from the magnetic tape 1 by the magnetic heads 4 and 5 at the terminals 200b and 200c respectively, after appropriate processing. The operation of the circuit shown in FIG. 8, therefore, will be explained partially with reference to FIG. 5.

In FIG. 5, at the time of reproduction, the reference signal of frame frequency is applied to the terminal 100, and therefore as in the manner mentioned above, the pulse g from the circuit 15 is servo-controlled in phase with the reference signal, so that the magnetic heads 4, 5 are driven at the rotational speed equal to the same frame frequency as in recording.

The signals alternately reproduced from the tape 1 by the magnetic heads 4, 5 are sufficiently amplified at the video signal processing circuit 50, and then through the terminal 60 in FIG. 8, applied to a low-pass filter 30 thereby to extract the tracking signal. Numeral 19' in FIG. 8 designates a local tracking signal source, which may be common to the source 19. Numeral 37 designates a selector circuit, the first and second input terminals of which are supplied with tracking signals $f_1$ and $f_2$ from the source 19', the third input terminal thereof being supplied with a pulse c from the rectangular wave generator circuit 9 of FIG. 5 via the terminal 70. At this selector circuit, the tracking signal $f_1$ is selected when the pulse c is "high", that is, when the tracking signal $f_1$ is selected at the time of recording (when the magnetic head 4 scans the tracking signal $f_1$); while the tracking signal $f_2$ is selected when the pulse c is "low", that is, when the tracking signal $f_2$ is selected at the time of recording (when the magnetic head 5 scans the tape). In both of these cases, at least during the scanning period for the tracking signal region P of FIG. 7, tracking signals $f_1$ and $f_2$ are selected and produced, while they are not produced during the other periods. The output of this circuit 37 is applied as a local tracking signal to a frequency converter circuit 31. At the frequency converter circuit 31, the reproduced tracking signal from the filter 30 is frequency-converted by the local tracking signal from the circuit 37, and the difference frequency component therebetween is produced from the circuit 31. Numerals 32, 38 designate tank circuits having resonance frequencies of $2f_x$ and $f_x$ respectively, and numerals 33, 39 detector circuits for detecting the envelope of the output of the circuits 32, 38 respectively.

In FIG. 7, in the case where the same track is scanned by the head as at the time of recording, such as when the magnetic head 5 scans the track $B_1$ recorded with the tracking signals $f_0$, $f_2$ (with the resulting waveforms of FIG. 8 shown in FIG. 9A), the tracking signals $f_0$ and $f_2$ are reproduced first from the main track $B_1$ in the tracking region P. On the other hand, the tracking signals $f_0$ and $f_1$ are detected as crosstalks from the upper adjacent track $A_1$ in the diagram, and the tracking signals $f_0$ and $f_1$ are also detected as crosstalks from the lower adjacent track $A_2$. Since these tracking signals from the two adjacent tracks are detected at different timings $2\tau$ apart, however, they do not occur at the same time. On the other hand, as explained above, during the scanning period of the magnetic head 5, the local tracking signal $f_2$ is produced from the circuit 37 and the reproduced tracking signal from the main track and the adjacent track is frequency-converted by the local tracking signal $f_2$ at the circuit 31, so that the circuit 31 produces a difference frequency component therebetween which is given from equation (5) as the component $f_0$ to $f_2 = f_x$ (a of FIG. 9A) and the component $f_1$ to $f_2 = 2f_x$ (b of FIG. 9A). Specifically, only the component of output $f_x$ (z in a of FIG. 9A) based on the tracking signal $f_0$ is detected from the main track $B_1$ only during the period $\tau$, while the tracking signal $f_2$ is not detected because the difference (error) signal is zero. From the adjacent tracks $A_1$ and $A_2$, on the other hand, the component $2f_x$ of the output based on the tracking signal $f_1$ is detected during the period $2\tau$ at regular intervals of time $2\tau$ as shown by x and y in b of FIG. 9A. The components of the output $f_x$ (u and v in a of FIG. 9A) based on the tracking signals $f_0$ of the adjacent tracks $A_1$ and $A_2$ are also detected, but as long as the main track is under scanning predominantly, the detection level thereof (u, v) is sufficiently low as compared with the detection level z based on the tracking signal $f_0$ from the main track. The component $f_x$ from the circuit 31 is extracted at the tank circuit 38, and after being sufficiently limited in band and amplified, is detected at the envelope detector circuit 39, and further shaped with an appropriate threshold value at a pulse wave shaping circuit 40. In this manner, the circuit 40 produces, as shown in c of FIG. 9A, a pulse only in response to the detection output (z) based on the tracking signal $f_0$ of the main track.

As seen from the above description, the component $2f_x$ (x, y) from the circuit 31 contains the crosstalk component of the tracking signals from the adjacent tracks on both sides, and the detection level thereof correspond to the tracking error. If the center of scanning on the main track $B_1$ is displaced toward the upper adjacent track $A_1$, the detection level (x) during the first period of $2\tau$ increases with a decrease in the detection level (y) during the next $2\tau$ period, while if the scanning center is displaced toward the lower adjacent track $A_2$, the reverse is the case. By comparing these two detection levels (x and y), therefore, the amount of tracking error and the polarity of error can be detected. The component $2f_x$ from the circuit 31 is extracted at the tank circuit 32, and after being sufficiently limited in band and amplified, is detected at the envelope detector circuit 33, the output of which is supplied to one input terminal of the sample hold circuits 34 and 35 respectively.

The pulse from the circuit 40, on the other hand, is supplied to the sampling pulse generator circuit 41 thereby to generate a couple of sampling pulses $SP_1$ and $SP_2$. The first sampling pulse $SP_1$ (d of FIG. 9A) is generated by being triggered at the leading edge of the pulse from the circuit 40 in such a manner that the pulse width thereof is $2\tau$ or smaller. The second sampling pulse $SP_2$ (e of FIG. 9A), on the other hand, is generated about $2\tau$ later than the first sampling pulse. The first sampling pulse $SP_1$ is supplied as a sampling pulse for the circuit 34, and therefore the circuit 34 produces an error voltage based on the tracking error from one adjacent track ($A_1$) The second sampling pulse $SP_2$, by contrast, is supplied as a sampling pulse for the circuit 35, so that the circuit 35 produces an error voltage (tracking control signal) based on the tracking error from the other adjacent track ($A_2$). The error voltages from the circuits 34 and 35 are compared with each other at a voltage comparator circuit 36, the output of which is supplied to a terminal 80 and further to a capstan servo circuit 21 in FIG. 5 for negative feedback control of the capstan motor 20.

The above-mentioned operation is performed also for scanning by the magnetic head 4 of the next main track $A_2$ following the main track $B_1$ (with the waveforms produced as shown in FIG. 8 from the various parts). In this case, the waveforms are exactly the same as those produced in the former case, as the only difference is that the tracking signal $f_1$ is selected from the circuit 37. By this operation, the tape feed rate is controlled for tracking control in such a why that the quantities of crosstalks of the tracking signals from the adjacent tracks are the same, that is, in such a way that the magnetic head scans the center of the main track.

Figure 10:
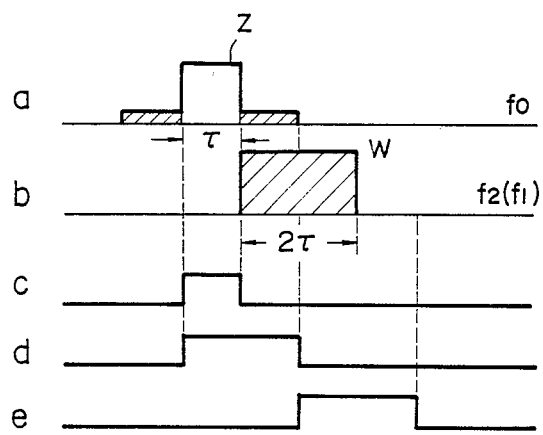

FIG. 10 shows waveforms produced at various parts in FIG. 8 under the reverse tracking condition where the magnetic head 4 scans the track $B_1$ different from the track scanned thereby for recording. In this case, the signal $f_1$ is selected as a local tracking signal, and the track $B_1$ recorded with the tracking signals $f_0$ and $f_2$ are scanned, so that the circuit 31 detects the components $2f_x$ (w of FIG. 10) based on the tracking signal $f_2$ from the track $B_1$ following the component $f_x$ (z in FIG. 10) based on the tracking signal $f_0$ from the currently-scanned track $B_1$, without detecting the tracking error data based on the tracking signal $f_1$ from the adjacent tracks $A_1$ and $A_2$. As a result, as seen from the waveforms of FIG. 10, the output voltages from the circuits 34 and 35 fail to coincide with each other and remain unbalanced. It will therefore been seen that the system is not settled in the inverted tracking condition, since under the reverse trackng condition, a large error voltage is obtained from the circuit 36 to restore the normal tracking condition, thus shortening the pull-in time of the system. This function is obtained from the fact that the local tracking signals $f_1$ and $f_2$ are switched with each other according to the scanning by the magnetic heads as one of the novel concepts of the present embodiment, whereby the tracks are identified automatically.

By this tracking control, the video signals alternately reproduced by the magnetic heads 4 and 5 from the video recording regions in FIG. 7 are switched with each other at a video signal processing circuit 50 in response to the pulse g from the latch circuit 15 in FIG. 5, thus producing one continuous reproduced video signal. This reproduced video signal is not mixed with a reproduced tracking signal.

As clear from the above explanation, the tracking signals recorded in the overlapped portion $Q_1$ of FIG. 7 are completely separated from the reproduced video signal, and therefore the recording level thereof can be improved sufficiently, so that a reproduced tracking signal with a high S/N ratio can be obtained for stable tracking control.

According to this embodiment, the tracking signals are arranged in relation to the displacement distance $\tau$ of adjacent tracks at the track ends. This displacement distance may be set as desired and is not limited as in the above-described prior art apparatuses.

Further, the arrangement of the tracking signals in relation to the displacement distance $\tau$ permits production of the tracking error data with minimum tracking signal recording region and maximum time as will be described later. For the purpose of comparison with the above-mentioned well-known apparatuses, assume that the displacement distance $\tau$ is the same 1.5H. The recording period $T_A$ of the tracking signals necessary for obtaining at least one tracking error data is given as $$T_A = 3\tau = 4.5H \quad (6)$$

The period $T_E$ for obtaining the tracking error data for each detection of crosstalks is expressed as $$T_E = 2\tau = 3.0H \quad (7)$$

Comparison of equations (6) and (7) with equations (1) to (4) clearly indicates that according to the present invention, the value $T_A$ is reduced while the value $T_E$ can be increased. An increased $T_E$ means the capability of detecting more tracking error data over a longer time, and therefore more accurate tracking control is possible. Also, by an accumulated effect over time period, a more stable tracking control is realized.

The embodiment of FIG. 5 concerns the case in which the recording time of the tracking signals $f_1$ and $f_2$ are determined at $2\tau$ for an increased $T_E$. As an alternative, the delay time in the circuit 10 b may be determined at other than $2\tau$, such as at $\tau$, in which case the value $T_E$ is reduced but the value $T_A$ can be reduced even more thereby to improve the recording density along the tape length.

In the embodiment mentioned above, the tracking signals are recorded only in the overlapped portion $Q_1$ shown in FIG. 7. This embodiment, however, is not limited to such a case, but the signals may be recorded in a plurality of overlapped portions $Q_1$ and $Q_2$. Also, instead of recording in these overlapped portions $Q_1$, $Q_2$, the vertical blanking position of the recorded video signal may be used, in which case, even if the tracking signal interfere with the video signal, the fact that the recording position is in the vertical blanking period prevents the appearance on the reproduced picture.

In this embodiment, the main signal to be recorded is not limited to the video signal, but may be a PCM signal digitized from the video signal or audio signal or other form of signal to equal effect.

Further, the embodiment of FIG. 5 shows the case in which the tape 1 is wound on the disc 2 at an angle of 180 degrees with two heads. The present invention is not limited to such a construction but may be applied to an apparatus with the desired tape winding angle and any desired number of heads. Also, the recording position of the tracking signals is not limited in the overlapped portions but they may be recorded in time division such a manner that the recording region of the main signal and that of the tracking signals are separated along the length of the tracks in an apparatus with a fixed winding angle and number of heads to eliminate overlapped portions, in any case to equal effect.

A modified form of the above-mentioned embodiment will be explained again with reference to FIG. 5. The azimuth angle of the magnetic heads 4, 5 and the frequency of the tracking signal of the circuit shown in FIG. 5 may be determined as shown below.

The magnetic heads 4 and 5, which have different azimuth angles and mounted at 180 degrees to each other on the disc 2, are rotated with the disc 2 by the disc motor 6.

The tracking signal source 19 produces at least two tracking signals, here, first, second and third tracking signals $f_0$, $f_1$, $f_2$ of different frequencies. The frequency of the first tracking signal $f_0$ is higher than those of the second and third tracking signals $f_1$ and $f_2$, and is determined to involve an azimuth loss sufficiently large against the azimuth angle of the magnetic heads 4 and 5. The frequencies of the second and third tracking signals $f_1$ and $f_2$, on the other hand, are determined to involve an azimuth loss sufficiently small against the azimuth angle of the magnetic heads 4 and 5. Thus the frequencies $f_0$, $f_1$ and $f_2$ are not in the relation defined in equation (5).

The other construction is the same as that of FIG. 5, and therefore may be met by the explanation on the recording pattern shown in FIG. 7.

Figure 11:
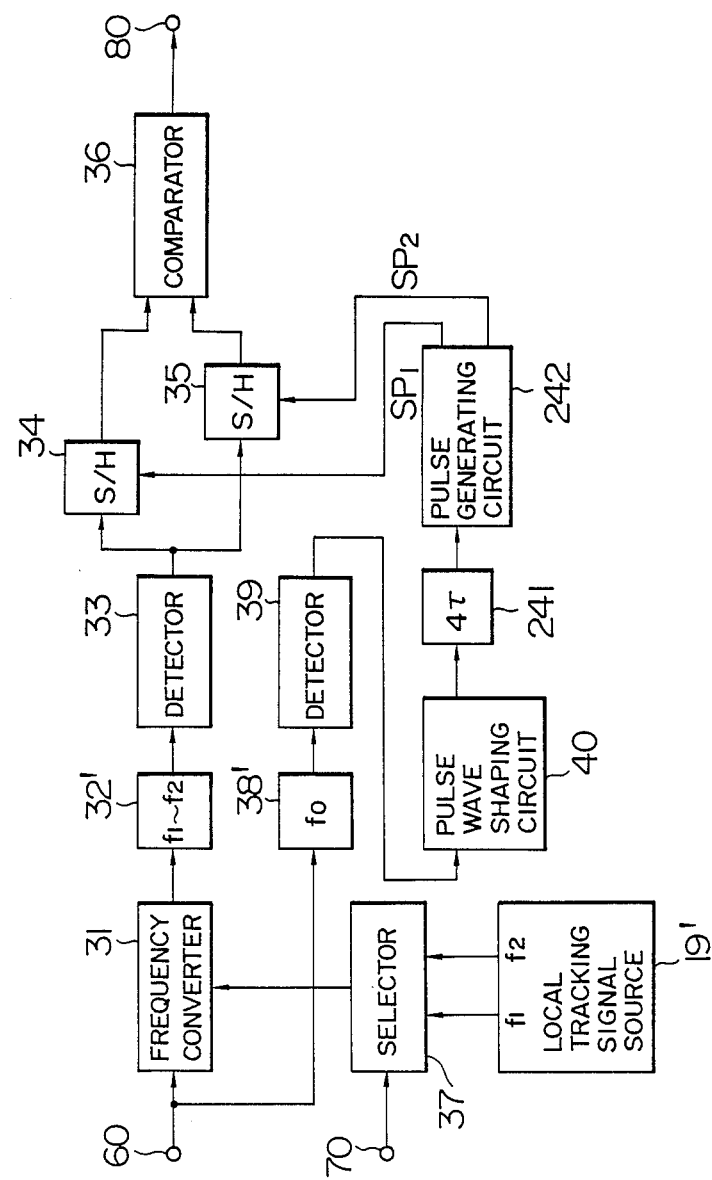
FIG. 11 is a diagram showing a tracking control in another embodiment of the present invention.

FIG. 11 is a diagram showing a tracking control for reproduction using the tracking signals used in the above-mentioned modification, which tracking control will be explained below with reference to the waveforms illustrated in FIGS. 12A, 12B. The servo control for reproduction, which is not shown, may utilize most of the servo control for recording shown in FIG. 5, except for the differences that the circuits 17, 18 are not used, that the terminal 100 is supplied with a predetermined reference signal of frame period instead of the vertical sync signal of frame period, that the tracking error signal, i.e., tracking control signal, from the tracking control unit of FIG. 11 mentioned later is applied to the terminal 22 whereby the capstan motor 20 is controlled via the capstan servo circuit 21, and that the video signal processing circuit 50 produces the video signal and the tracking signals reproduced from the magnetic tape 1 by the magnetic heads 4 and 5, at the terminals 200b and 200c respectively, after appropriate processing. The operation of the circuit shown in FIG. 11, therefore, will be explained partially with reference to FIG. 5.

In FIG. 5, at the time of reproduction, the reference signal of frame frequency is applied to the terminal 100, and therefore, as in the preceding case, the pulse g from the circuit 15 is subjected to servo control in phase with the difference signal, so that the magnetic heads 4, 5 are driven at the rotational speed equal to the same frame frequency as in the recording. The signals alternately reproduced from the tape 1 by the magnetic heads 4, 5 are sufficiently amplified at the circuit 50, and separated into the video signal and the tracking signal, the reproduced tracking signal appearing at the terminal 200c.

In FIG. 11, numeral 19' designates a local tracking signal source, which may be common to the source 19 in FIG. 5. Numeral 37 designates a selector circuit, first and second input terminals of which are supplied with the local tracking signals $f_1$ and $f_2$ from the tracking signal generator circuit 19, a third input terminal thereof being supplied with a pulse c via the terminal 70 from the square wave generator circuit 9 shown in FIG. 5. This selector circuit 37 selects the same tracking signal $f_1$ as long as the magnetic head 4 scans the tape when the pulse c is "high", that is, when the tracking signal $f_1$ is selected in recording mode. On the other hand, the circuit 37 selects the tracking signal $f_2$ as long as the magnetic head 5 scans the tape when the pulse c is "low", that is, when the tracking signal $f_2$ is selected at the time of recording. In any case, the tracking signals $f_1$, $f_2$ are selectively produced during the scanning period of the tracking signal region P, while such signals are not produced during the remaining period. The output from this circuit 37 is applied as a local tracking signal to one of the input terminals of the frequency converter circuit 31. The other input terminal of the frequency converter circuit 31 is supplied with the reproduced tracking signal via the terminal 60 from the terminal 200c. The reproduced tracking signal from the terminal 60 is frequency-converted at the frequency converter circuit 31 by the local tracking signal from the circuit 37, and the error frequency component therebetween is produced from the circuit 31.

Figure 12A:
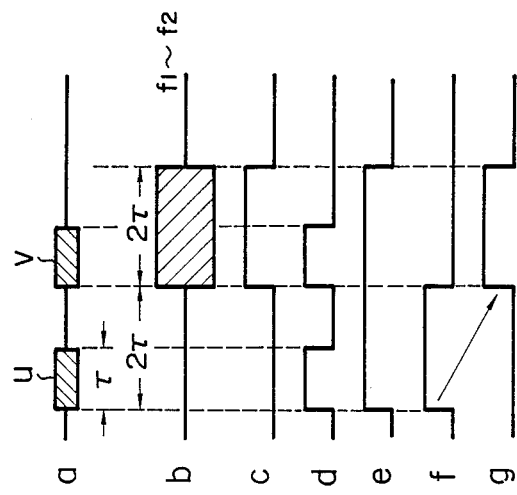
FIGS. 12A, 12B show waveforms produced in the tracking control in FIG. 11.
Figure 12B:
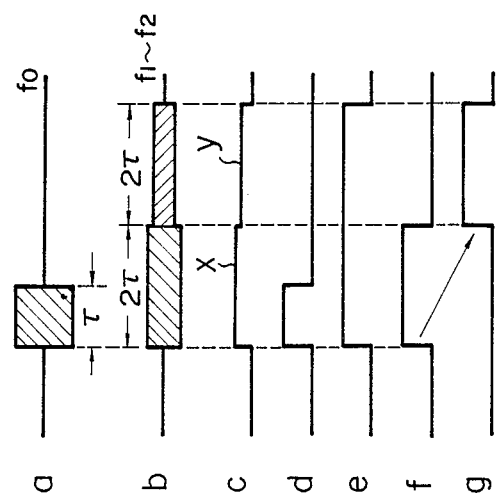

In FIG. 7, in the case where the heads scan the same track as in recording, such as when the magnetic head 5 scans the track $B_1$ recorded with the tracking signals $f_0$, $f_2$ (with the waveforms of FIG. 11 produced as shown in FIG. 12A), the tracking signals $f_0$ and $f_2$ are reproduced from the main track $B_1$ at the trackng signal region P. Since the recording in the adjacent tracks $A_1$ and $A_2$ is at an azimuth angle different from that of the main track $B_1$, however, the tracking signal $f_0$, of which the frequency is sufficiently high to make the azimuth loss sufficiently large as compared with the azimuth angle thereof, is not detected from the adjacent tracks $A_1$ and $A_2$, while the tracking signal $f_1$ of a frequency to make the azimuth loss sufficiently small as compared with the azimuth angle is detected from the adjacent tracks $A_1$ and $A_2$ as crosstalks. The crosstalks from these adjacent trackes, though of the same frequency, are different in detection timing and detected with the time delay of $2\tau$ from each other, and therefore are not overlapped in timing. During the scanning period of the magnetic head 5, on the other hand, the circuit 37 produces the local tracking signal $f_2$ as mentioned above, and the reproduced tracking signals from the adjacent tracks are frequency-converted by the local tracking signal $f_2$ at the circuit 31, so that the circuit 31 produces the components $f_0 \sim f_2$ and $f_1 \sim f_2$ as an error frequency components. Of these two frequency components, only the component $f_1 \sim f_2$ is extracted by the band-pass filter 32'. The output of the filter 32' (b of FIG. 12A) is subjected to envelope detection at the detector circuit 33. Numeral 38' designates a band-pass filter for passing only the frequency component $f_0$ among the reproduced tracking signals produced from the terminal 60 and the filter 38' detects only the output (a of FIG. 12A) based on the tracking signal $f_0$ from the main track $B_1$ during the period $\tau$. Also, the detector circuit 33 detects only the outputs based on the tracking signals $f_1$ from the adjacent tracks $A_1$ and $A_2$ during the period $2\tau$ with the time lag of $2\tau$ as shown by x and y in c of FIG. 12A. The tracking signal of the main track $B_1$, on the other hand, is not detected from the detector circuit 33 due to the fact that the difference from the frequency of the local tracking signal $f_2$ is zero. The output from this detector circuit 33 contains only the crosstalk components from the adjacent tracks, and the output levels thereof x and y correspond to the amount of the tracking error. In the event that the center of scanning is displaced toward the adjacent track $A_1$ from the main track $B_1$, therefore, the detection level x during the first period $2\tau$ increases with a decrease of the detection level y in the next period $2\tau$. If the center of scanning is displaced toward the other adjacent track $A_2$, in contrast, the exactly opposite relation applies. As a result, by comparing the detection levels x and y, it is possible to detect the polarity for determining the amount of tracking error and the side to which the tracking is displaced. The output of the circuit 33 is applied to one of the sample hold circuits 34 and 35. The output from the filter 38', on the other hand is subjected to envelope detection at the detector circuit 39, and then pulse-shaped at an appropriate threshold at the pulse shaping circuit 40.

Numeral 241 designates a delay circuit constituted by, e.g., a multivibrator with a delay time of $2\tau$ or more, such as $4\tau$, which is triggered at leading edge of the output pulse (d of FIG. 12A) from the circuit 40 to produce a pulse (e of FIG. 12A) with the duration of $4\tau$. The pulse from this circuit 241 is applied to the sampling pulse generator circuit 242 to generate a couple of sampling pulses $SP_1$ and $SP_2$. The first sampling pulse $SP_1$ (f of FIG. 12A) is produced by being triggered at the leading edge of the pulse from the circuit 241 in such a manner that the pulse duration thereof is $2\tau$ or less. The second sampling pulse $SP_2$ (g of FIG. 12A), on the other hand, is generated with time delay of about $2\tau$ from the first sampling pulse. This first sampling pulse $SP_1$ is supplied as a sampling pulse for the circuit 34, and therefore an error voltage based on the tracking error from one adjacent track $A_1$ is produced from the circuit 34. The second sampling pulse $SP_2$, by contrast, is supplied for the circuit 35, so that the circuit 35 produces an error voltage associated with the tracking error, i.e., the tracking control signal from the other adjacent track $A_2$. The error voltage from these circuits 34 and 35 are compared with each other at the voltage comparator circuit 36, the output of which is applied as a tracking error signal via the terminal 80 to the terminal 22 of the capstan motor servo circuit 21 shown in FIG. 5, whereby the capstan motor 20 is subjected to negative feedback control.

The aforementioned operation is also the same for in the case where the main track $A_2$ following the main track $B_1$ is scanned by the magnetic head 4 of the same azimuth angle as the main track $A_2$, in which case the only difference is that the local tracking signal $f_1$ is selected from the circuit 37, while all the waveforms produced at the various parts are identical to those of the cited case. By the above-mentioned operation, the tape speed is controlled for tracking control, in such a way that the quantities of crosstalks of the tracking signals from the adjacent tracks are equal to each other, that is, the center of the main track is scanned.

Now, explanation will be made about the case of inverted tracking, such as the case in which the magnetic head 4 scans the track $B_1$ which is different from that scanned for recording. In this case, the waveforms shown in FIG. 12B are produced from the various parts of FIG. 11. The signal $f_1$ is selected as a local tracking signal, and the track $B_1$ recorded with the tracking signals $f_0$ and $f_2$ at a different azimuth angle from the magnetic head 4 is scanned by the magnetic head 4. As a result, since the azimuth loss is large for the tracking signal $f_0$, as mentioned above, the tracking signal $f_0$ is not detected from the track $B_1$ under scanning. Instead, the tracking signal $f_0$, not the azimuth loss, is detected as a crosstalk from the adjacent tracks $A_1$ and $A_2$ recorded by the magnetic head 4. Therefore, as shown in a of FIG. 12B, the outputs u and v based on the tracking signal $f_0$ from the adjacent tracks $A_1$ and $A_2$ are detected at time intevals of $2\tau$ from the filter 38'. The output of the filter 38' are pulse-shaped at the circuit 40 after being detected. Since the circuit 241 is comprised of a delay multivibrator circuit with the delay time of $4\tau$, however, the frequency-dividing function thereof causes the circuit 241 to produce only the pulse (e of FIG. 12B) based on the output u advanced in timing among the outputs of the filter 38', thereby inhibiting the output v. The circuit 242 thus produces sampling pulses $SP_1$ and $SP_2$ based on the output u, but not any sampling pulses based on the output v. The frequency of the tracking signal from the track $B_1$ under scanning, on the other hand, is determined in such a manner that the azimuth loss thereof is sufficiently small as compared with the azimuth angle of the magnetic head 4, and therefore even under the reversed tracking condition, the tracking signal $f_2$ is detected from the track $B_1$ under scanning, so that the filter 32' produces only an output (b of FIG. 12B) based on the error frequency component $f_2 - f_1$ with the local tracking signal $f_1$, while the tracking error data based on the tracking signal $f_1$ from the adjacent tracks $A_1$ and $A_2$ is not detected. As a result, as seen from the waveforms of FIG. 12B, the output voltage of the circuit 34 fails to coincide with that of the circuit 35 but they are unbalanced with each other, leading to a great error voltage produced from the circuit 36. This fact clearly indicates that the system nevers settles under the inverted tracking condition, in which a great error signal is produced to restore the normal tracking condition, thus shortening the pull-in time of the system. This function is secured by switching the local tracking signals $f_1$ and $f_2$ in response to the drive of the magnetic heads, whereby automatic track identificaticn is made possible.

The video signals alternately reproduced at the magnetic heads 4 and 5 from the recording region V in FIG. 7 by the above-mentioned tracking control are switched with each other at the video signal processing circuit 50 in response to the pulse g from the circuit 15 of FIG. 5, so that a single continuous video signal is produced at the terminal 200b, which signal is not mixed with the reproduced tracking signals. As seen from the above description, the tracking signal recorded in the overlapped portion $Q_1$ of FIG. 7 is completely separated from the reproduced video signal, and therefore the recording level thereof is sufficiently improved, with the result that a reproduced tracking signal with a high S/N ratio is obtained to achieve a stable tracking control.

According to the present invention, the tracking signals are arranged in relation to the displacement distance $\tau$ of adjacent tracks at track ends, which displaced distance may be set as desired without any restrictions on the advantages of the present invention. Further, the arrangement of the tracking signals in relation to the amount of displacement distance $\tau$ minimizes the recording region of the tracking signal on the one hand and maximizes in timing the tracking error data obtained on the other hand. For the purpose of comparing this fact with the above-mentioned prior art, assume that the track end displacement $\tau$ is 1.5H. The recording period $T_A$ for the tracking signal required to obtain at least one tracking error data is given by $$T_A = 3\tau = 4.5H \tag{8}$$

The period $T_E$ for obtaining the tracking error data for each detection of crosstalks is expressed by the equation $$T_E = 2\tau = 3.0H \tag{9}$$

Comparison of the equations (8) and (9) with equations (1) to (4) indicate that according to the present embodiment, the value $T_A$ may be minimized while at the same time maximizing the value $T_E$. Especially, the fact that the value $T_E$ can be increased is indicative of the capability of detecting more tracking error data within a given time and also the possibility of an accumulated effect over a time period, thus making possible more accurate, safe tracking control.

Apart from the above-mentioned embodiment wherein the tracking signals are recorded only in the overlapped portion $Q_1$ of FIG. 7, the present invention is not limited to such a construction. Instead, the overlapped portion $Q_2$ of FIG. 7 may be used, or tracking signals may be recorded at a plurality of points in the overlapped portions $Q_1$ and $Q_2$. Also, in place of the overlapped portions $Q_1$, $Q_2$, the tracking signals may be recorded in the vertical blanking position of the video signal, in which case the tracking signals, which might interfere with the video signal, does not appear on the reproduction picture since the recording position thereof is in the blanking period. Also, according to the present embodiment, the main signal to be recorded is not limited to the video signal, but a desired signal such as a PCM signal digitized from the video signal or audio signal may be recorded with equal effect. Further, unlike in the case shown above wherein the tape 1 is wound on the disc 2 at 180 degrees with two heads in FIG. 5, the present embodiment may be applied to a given winding angle and a desired number of heads. Also, the recording position of the tracking signals is not limited to the overlapped portions, but in the system constructed so as to eliminate the overlapped portions, the main signal and the tracking signals may be recorded in time division along the length of tracks in recording regions separated from each other. Furthermore, the tracking signals may be recorded directly or with the main signal as a bias or with other signals different from the main signal as a bias. Any of the above-mentioned cases attains the same effect.

Figure 13:
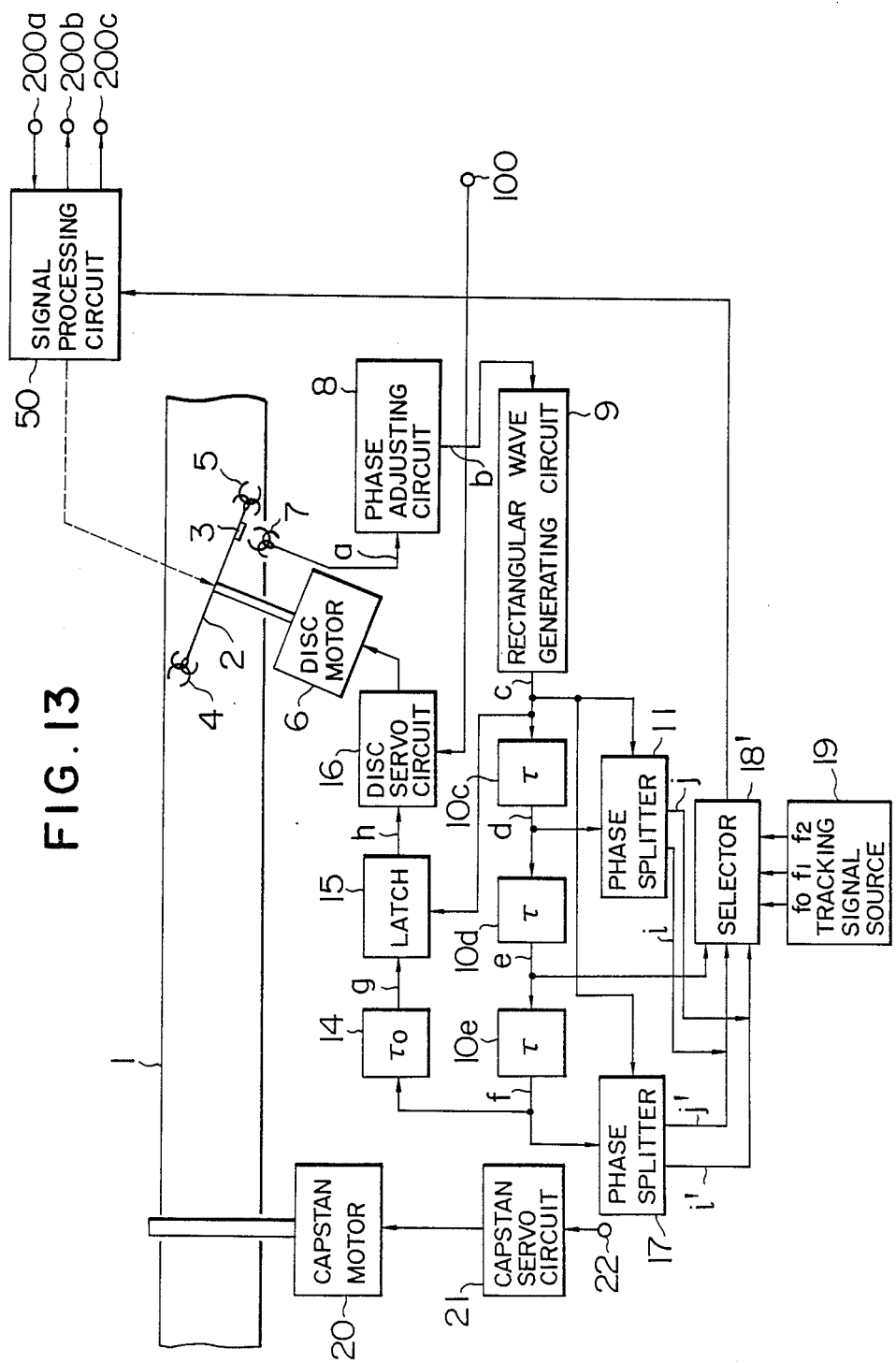
FIG. 13 is a diagram showing a recording servo control in another embodiment of the present invention.
Figure 14:
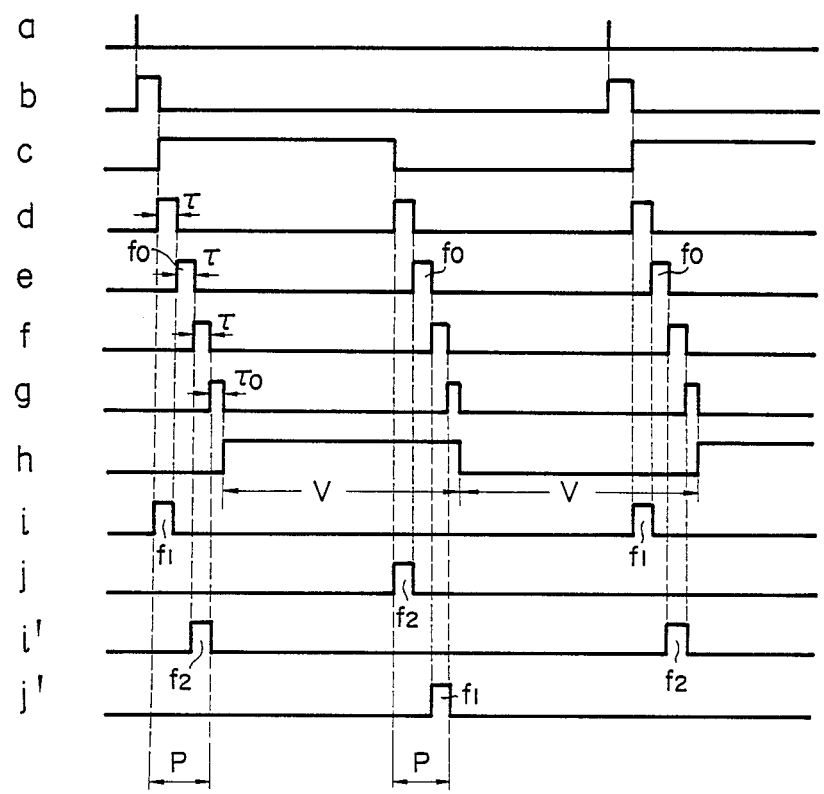
FIG. 14 is a diagram showing waveforms produced at various parts in FIG. 13.
Figure 15:
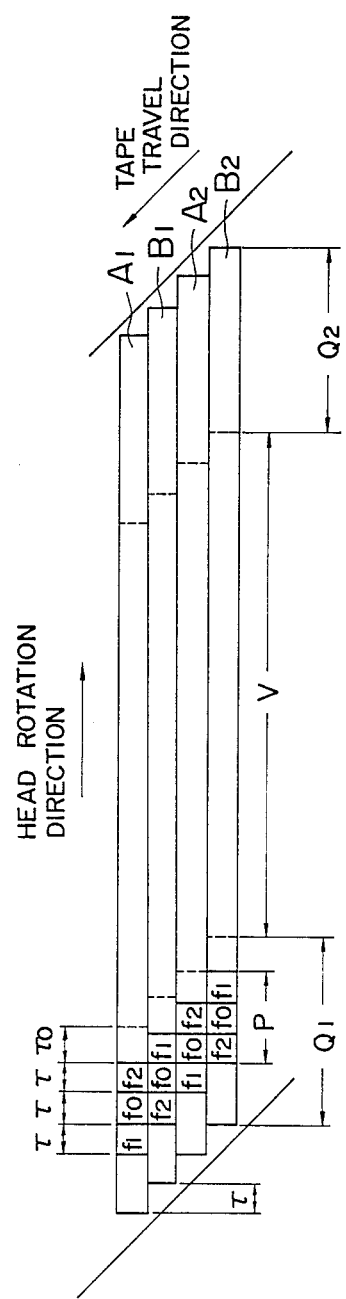
FIG. 15 shows a tape pattern for FIG. 13.
Figure 16:
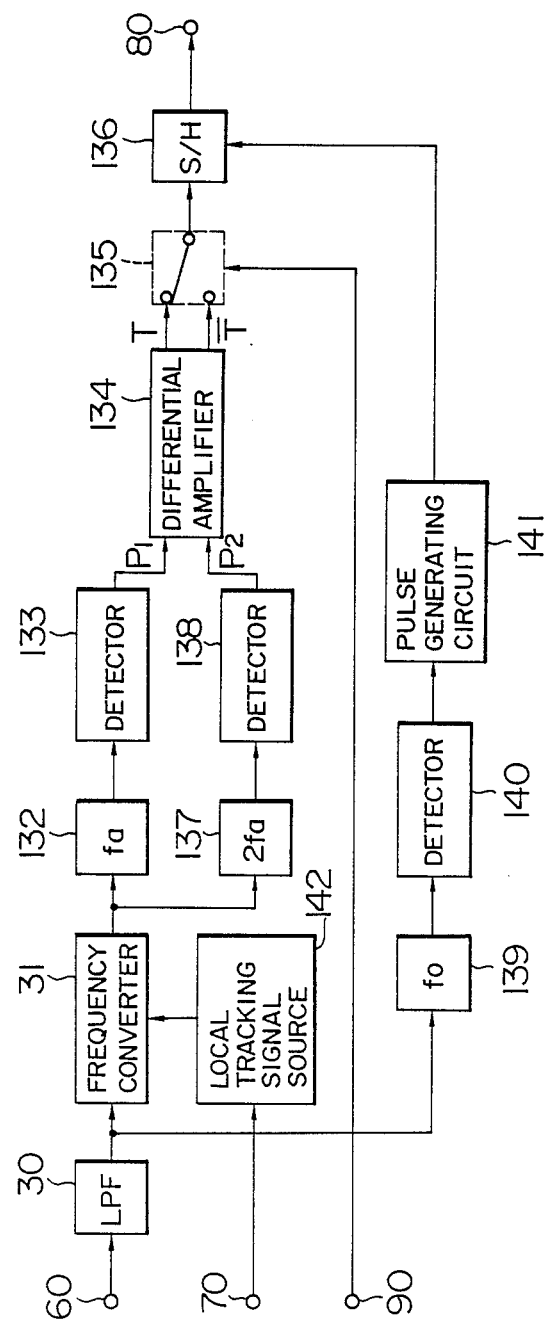
FIG. 16 is a diagram showing a tracking control in another embodiment of the present invention.
Figure 17A:
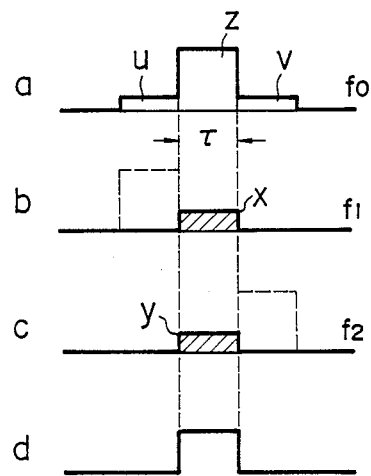
FIGS. 17A, 17B and 18 illustrate waveforms produced in the tracking control in FIG. 16.
Figure 17B:
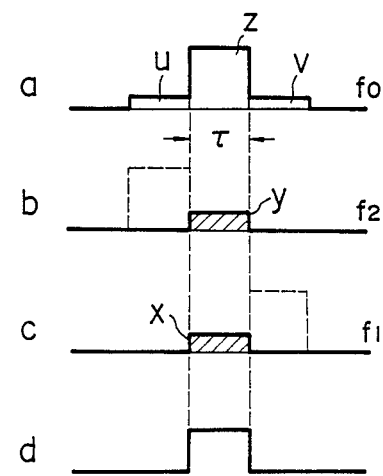
Figure 18:
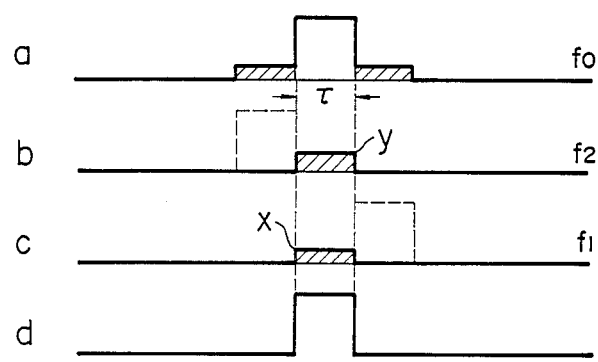

Another embodiment of the present invention will be explained with reference to FIG. 13. FIG. 13 is a diagram showing the servo control for recording according to the present as applied to rotary head-type helical scan VTR; FIG. 14 shows waveforms for explaining the operation of the circuit of FIG. 13; FIG. 15 is a diagram showing a track pattern formed by being recorded by the operation; FIG. 16 is a diagram showing the tracking control for reproduction; and FIGS. 17A, 17B and 18 show waveforms produced at various parts of the circuit for explaining the operation of the same circuit.

In FIG. 13, the magnetic tape 1 is driven by the capstan motor 20, which in turn is controlled at a predetermined velocity by the capstan servo circuit 21. The rotary heads 4, 5 are mounted at the angle of 180 degrees to each other on the disc 2, and adapted to be rotated with the disc 2. The tape 1 is wound slightly excessively from 180 degrees on the disc 2, thus forming overlapped portions designated by $Q_1$ and $Q_2$ of FIG. 15 on the track. A magnet 3 is mounted on the disc 2, and is detected by a tachometer head 7, thereby to produce a pulse a (a of FIG. 14) from the head 7 in synchronism with the rotation of the magnetic heads 4 and 5. The pulse a produced from the tack head 7 is phase-adjusted by a phase adjusting circuit 8 so that the magnetic heads 4, 5 and the tape 1 is in predetermined positional relation with each other, after which the output b (b cf FIG. 14) is applied to a rectangular wave generator circuit 9. From this circuit 9, a pulse c with the duty cycle of 50% (c of FIG. 6) is produced in synchronism with the rotation of the magnetic heads 4, 5.

Numeral 10c designates a delay circuit constituted, e.g., a multivibrator, which is triggered at the leading and trailing edges of the pulse c from the circuit 9 to produce a pulse d of time duration $\tau$ corresponding to the displacement distance of adjacent tracks at track ends (d of FIG. 14). A delay circuit 10d constituted by, e.g., a multivibrator produces a pulse e (e of FIG. 14) with time duration $\tau$ by being triggered at the trailing edge of the pulse d from the circuit 10c. In similar fashion, the pulse f with the time duration of $\tau$ (f of FIG. 14), which is triggered at the trailing edge of the pulse e from the circuit 11 is produced by a delay circuit 10e constituted by, e.g., a multivibrator. Numeral 15 designates a latch circuit for latching the pulse c from the circuit 9 at the trailing edge of the pulse g from the circuit 14, so that the pulse c from the circuit 9 as delayed by the time $(\tau+\tau+\tau+\tau_0)$ is produced from the circuit 15 in the form of the pulse h (h of FIG. 14). The pulse h of this circuit 15 is applied to one of the input terminals of the disc servo circuit 16, the other input terminal thereof being supplied with the vertical sync signal of frame period of the video signal to be recorded, as a reference signal for the disc servo system, from the terminal 100. The disc servo circuit 16 compares the pulse h from the circuit 15 with the reference signal from the terminal 100, so that the phase error signal representing the phase difference therebetween is produced from the circuit 16 and is applied to the disc motor 6, with the result that the pulse h is synchronized in phase with the reference signal by servo control, thus driving the magnetic heads 4, 5 at the rotational speed equal to the frame frequency.

Numeral 11 designates a phase splitter for subjecting the pulse d from the circuit 10c to two-phase division by pulse c, so that the pulse i (i of FIG. 14) and the pulse j (j of FIG. 14) are produced alternately during the periods when the pulse c is "high" and "low" respectively. Numeral 17 designates a similar phase splitter for subjecting the pulse f from the circuit 10e to two-phase division in response to the pulse c, so that a pulse i' (i' of FIG. 14) and a pulse j' (j' of FIG. 14) are produced alternatively during the period when the pulse c is "high" and "low" respectively.

Numeral 19 designates a tracking signal generator circuit for generating three frequency tracking signals $f_0$, $f_1$, $f_2$. The frequencies of these tracking signals may be determined with a given frequency $f_a$ as follows:

$$\left. \begin{array}{l} f_1 = f_0 + f_a \\ f_2 = f_0 + 2f_a \end{array} \right\} \quad (10)$$

Numeral 18' designates a tracking signal selector circuit for selecting the tracking signal $f_0$ during the period of pulse width $\tau$ in response to the pulse e from the circuit 10d; the tracking signal $f_1$ is selected during the pulse width $\tau$ in response to the pulse j' from the circuit 17 and the pulse i from the circuit 11; and the tracking signal $f_2$ is selected during the pulse width $\tau$ in response to the pulse i' from the circuit 17 and the pulse j from the circuit 11. Thus, as obvious from FIG. 14, the circuit 18' produces the tracking signals $f_1$, $f_0$ and $f_2$ in that order during the "high" (pulse h "low") state of the pulse c, and the tracking signals $f_2$, $f_0$ and $f_1$ in that order during the "low" state (pulse h in "high" state) of the pulse c.

The tracking signal from this circuit 18' is applied through the video signal processing circuit 50 and is recorded together with the video signal by the magnetic heads 4, 5.

FIG. 15 is a diagram showing a track pattern formed by being recorded by the recording servo control unit mentioned above. In this drawing, characters $Q_1$ and $Q_2$ designate overlapped portions formed by the tape 1 being wound excessively over 180 degrees on the disc 2. The tracking signals are recorded in the regions designated as P of the overlapped portion $Q_1$. Character V designates the recording region for the video signal formed by winding of 180 degrees. The video signal is also recorded in the overlapped portions $Q_1$ and $Q_2$ other than this region V. In this case, therefore, the tracking signal may be recorded by frequency multiplication in the region P together with the video signal. The video signal at the overlapped portions is eliminated at the time of reproduction, and therefore, if the recording level of the tracking signal is raised, the reproduced video signal is not deteriorated. As a result, the recording region for the tracking signal is effectively separated from that of the main signal. These two types of signals can of course be completely separated by temporarily stopping the recording of the video signal in the region P. The present embodiment is also applied to equal effect to the case in which signals other than the main signal are recorded in the regions immediately adjacent to the region including or not including the region P. In FIG. 15, the degree of displacement of adjacent tracks at track end (expressed by $\tau$ in the drawing) is determined by the running speed of the tape 1 and the rotational speed of the rotary heads 4, 5, and is given as the length of time $\tau$ for scanning by the rotary heads. As mentioned with reference to FIG. 14, on the other hand, the tracking signals $f_1$ and $f_2$ are recorded for the time equal to the displacement distance $\tau$; the tracking signal $f_0$ for the time equal to the displacement distance $\tau$ following the signals $f_1$ and $f_2$; and the tracking signals $f_2$ and $f_1$ for the time equal to the displacement distance $\tau$ following the tracking signal $f_0$.

Therefore, as shown in FIG. 15, the recording start point of the tracking signal $f_0$ on the track coincides with that of the tracking signal $f_1$ or $f_2$ on the next adjacent track. Also, the recording finish point of the tracking signal $f_0$ coincides with the recording the tracking signal $f_2$ or $f_1$ on the track next but one.

FIG. 16 is a diagram showing the tracking control for reproduction using the above-mentioned tracking signals. The operation of the circuit of FIG. 16 will be explained with reference to the waveforms shown in FIGS. 17A and 17B. The servo control system for reproduction, which is not shown, shares most parts with the recording servo control system shown in FIG. 13, and is different from the latter only in that the circuits 11, 17 and 18' are not necessary, that the terminal 100 is supplied with a predetermined reference signal of frame period in place of the vertical sync signal of frame period, that the tracking error signal i.e., the tracking control signal, from the tracking control unit of FIG. 8 mentioned later is applied to the terminal 22 whereby the capstan motor 20 is controlled via the capstan servo circuit 21, and that the video signal processing circuit 50 produces the video signal and the tracking signals reproduced from the magnetic tape 1 by the magnetic heads 4 and 5 at the terminals 200b and 200c respectively, after appropriate processing. The operation of the circuit shown in FIG. 16 will, therefore, be explained partially with reference to FIG. 13.

In FIG. 13, in reproduction mode, the terminal 100 is supplied with the reference signal of frame frequency so that, as described above, the pulse h from the circuit 15 is subjected to servo control into phase with the reference signal, with the result that the magnetic heads 4 and 5 are driven at a rotational speed equal to the same frame frequency as at the time of recording.

The signals alternately reproduced from the magnetic heads 4 and 5, after being fully amplified, are applied via the terminal 60 in FIG. 16 to the low-pass filter 30 from which the tracking signal is extracted. Numeral 142 in FIG. 16 designates a local tracking signal source for generating a local tracking signal of the same frequency of the tracking signal $f_0$.

In response to the signal h supplied from the circuit 15 shown in FIG. 13 to the circuit 142 through the terminal 70, the tracking signal $f_0$ is produced from the circuit 142 only during the period including at least the period e in FIG. 14 (the period $\tau$ for recording the tracking signal $f_0$ in recording mode), the tracking signal being not produced for the other period. The output from the circuit 142 is applied as a local tracking signal to the frequency converter circuit 31. The frequency converter circuit 31 frequency-converts the reproduced tracking signal from the filter 30 by the local tracking signal $f_0$ from the circuit 142 thereby to produce an error frequency component therebetween from the circuit 31.

Numerals 132, 137 designate tank circuits having resonance frequencies of $f_a$ and $2f_a$ respectively. Numerals 133 and 138 designate detector circuits for detecting the envelope of the output of the circuits 132 and 137 respectively.

In FIG. 15, when a magnetic head scans the same track for reproduction as for recording, such as when the magnetic head 4 scans the track $A_2$ storing the tracking signals $f_1$, $f_0$ and $f_2$ in that order (the associated waveforms of FIG. 16 in this case are shown by (i) of FIG. 17A), then the tracking signals $f_1$, $f_0$ and $f_2$ are first reproduced from the main track $A_2$ in the tracking signal region P. Also, the tracking signals $f_2$, $f_0$ and $f_1$ are detected as crosstalks from the upper adjacent track $B_1$ in the same diagram, and the tracking signals $f_2$, $f_0$ and $f_1$ as crosstalks from the lower adjacent track $B_2$ in similar manner. These two groups of tracking signals, however, are detected at timings different by $2\tau$ from each other. As a result, the crosstalks of frequency $f_1$ from the upper adjacent track $B_1$ and those of frequency $f_2$ from the lower adjacent track $B_2$ are detected simultaneously when the tracking signal reproduced from the main track $A_2$ is of frequency $f_0$.

As described above, the circuit 19 produces the local tracking signal $f_0$, and the reproduced tracking signals from the main track and tracks adjacent thereto are frequency-converted by the local tracking signal $f_0$ at the circuit 31, so that the circuit 31 produces an error frequency component therebetween given as the component $2f_a (=f_2 \sim f_0)$ of the component $f_a (=f_1 \sim f_0)$ (b of FIG. 17A) from the equation (5) above.

Specifically, the output $f_a$ based on the tracking signal $f_1$ is produced from the adjacent track $B_1$ as shown by x in b of FIG. 17A, and the output $2f_a$ based on the tracking signal $f_2$ is produced from the adjacent track $B_2$ as shown by y in c of FIG. 17A, at the same time during the period $\tau$.

Although the tracking signal $f_0$ (u and v of FIG. 17A) is also detected from the adjacent tracks $B_1$ and $B_2$, the detection levels thereof (u, v) are sufficiently low as compared with the detection level (z in a of FIG. 17A) of the tracking signal $f_0$ from the main track.

Numeral 139 designates a tank circuit for the frequency $f_0$, which after being limited sufficiently in bandwidth and amplified at the circuit 139, is detected at the envelope detector circuit 140, and shaped into an appropriate threshold value at the pulse generating circuit 141. The circuit 141 thus produces a pulse as shown in d of FIG. 17A which consists only of the detection output z of the tracking signal of the main track.

As obvious from the foregoing description, the components $f_a$ and $2f_a$ from the circuit 31 contain only the crosstalk components from the adjacent tracks, and the detection level corresponds to the tracking error. In the case where the scanning center is displaced from the main track $A_2$ toward the upper adjacent track $B_1$, the detection level (x) of $f_a$ increases while the detection level (y) of $2f_a$ decreases. In similar manner, in the case where the scanning center is displaced toward the lower adjacent track $B_2$, the reverse is the case. When the magnetic head 5 scans the track $B_1$ (in which case the wave-forms shown in FIG. 16 are produced in the forms shown in FIG. 17B respectively), the frequency of the crosstalk from the upper adjacent track is $f_2$ and that from the lower adjacent track is $f_1$ if the tracking signal reproduced from the main track $B_1$ is $f_0$, which is exactly the opposite to the preceding case in which the magnetic head 4 scans the track $A_2$. In the event that the scanning center is displaced from the main track $B_1$ toward the upper adjacent track $A_1$, therefore, the detection level (y) of $2f_a$ increases while the detection level (x) of $f_a$ decreases; and in similar manner, the reverse is the case if the scanning center is displaced toward the lower adjacent track $A_2$.

The components $f_a$ and $2f_a$ produced from the circuit 31, after being fully limited in bandwidth and amplified by the tank circuits 132 and 137 respectively, are detected at the envelope detector circuits 133 and 138 respectively into voltage signals $P_1$ and $P_2$ corresponding to the amplitudes thereof. After that, the error between these two signals is determined at the differential amplifier 134, which produces the error voltage signals T and $\overline{T0}$ between the components $f_a$ and $2f_a$ as differential outputs thereof.

The direction of increase or decrease in the error frequency signal against the tracking deviation associated with the main track $A_1$ or $A_2$ is opposite to that associated with the main track $B_1$ or $B_2$, as mentioned above. Therefore, the differential amplifier 134 produces a couple of error voltage signals of different polarities $K(P_1-P_2)=T$ and $K(P_2-P_1)=\overline{T}$ (K: Constant), which are applied respectively to a switch circuit 135 to perform such a switching operation that by use of the pulse c (c of FIG. 6) supplied from the circuit 9 of FIG. 13 via the terminal 90, the signal T is produced during the "high" state of the pulse c or during the scanning period of the head 4, and the signal $\overline{T}$ is produced during the "low" state of the pulse c, that is, during the scanning period of the head 5. The resulting output signal is applied to the sample-hold circuit 136. The pulse from the circuit 141, on the other hand, is so formed that the pulse duration thereof is $\tau$ or less, and is applied as a sampling pulse to the sample-hold circuit 136. The sample-hold circuit 136 extracts and produces a tracking error signal, i.e., a tracking control signal based on the tracking error, which is applied through the terminal 80 to the input terminal 22 of the capstan motor servo circuit 21 of FIG. 13 thereby to control the capstan motor 20 by negative feedback.

FIG. 18 shows waveforms produced at various parts in FIG. 16 under the inverted tracking condition, such as when the magnetic head 4 scans the track $B_1$ different from the track scanned thereby in recording mode. When the tracking signal reproduced from the main track $B_1$ is $f_0$, the frequency of the cross-talk from the upper adjacent track is $f_2$, while that from the lower adjacent track is $f_1$. Under this condition, on the basis of the pulse c (c of FIG. 14) produced from the circuit of FIG. 13 and supplied via the terminal 90, the tracking error signal, which would take the form of $\overline{T} = K(P_2 - P_1)$ under the normal tracking condition (that is, when the head 5 scans the track $B_1$), takes the form of $T = K(P_1 - P_2)$. Since the polarities are opposite in this case, the system fails to settle under the inverted tracking condition. This function is obtained by switching the polarities of the error voltage signals from the adjacent tracks in response to the scanning by the magnetic heads while maintaining the frequency of the local tracking signal $f_0$ constant. In other words, the track identification is effected automatically by this function.

The video signals reproduced alternately by the magnetic heads 4 and 5 from the video signal recording region V in FIG. 15 by the above-mentioned tracking control are switched alternately therebetween at the video signal processing circuit 50 in response to the pulse h from the circuit 14 of FIG. 13, with the result that a single continuous reproduced video signal is produced, without any reproduced tracking signal mixed therein.

As apparent from the foregoing description, the tracking signal recorded in the overlapped portion $Q_1$ in FIG. 15 is completely separated from the reproduced video signal, and therefore the recording level thereof can be improved. As a result, it is possible to obtain a reproduced tracking signal with a high S/N ratio, thus permitting a stable tracking control.

According to the embodiment under consideration, the tracking signals are arranged in relation to the displacement distance $\tau$ of adjacent tracks at track end, which displacement distance can be set as desired without any restrictions like in the prior art system described above.

Further, the arrangement of the tracking signals in relation to the displacement distance $\tau$ minimizes the recording region of the tracking signals and increases the amount of the tracking error signals that can be obtained within a given time period. For comparison with the above-mentioned prior art system, assume that the displacement distance $\tau$ is 1.5H. The recording period $T_A$ of the tracking signals necessary for obtaining at least one tracking error signal is given as $$T_A = 3\tau = 4.5H \quad (11)$$

The period $T_E$ in which the tracking error signal is obtained for each detection cycle, on the other hand, is given as $$T_E = \tau = 1.5H \quad (12)$$

Comparison of the equations (11), (12) with the equations (1) to (4) apparently shows that the value $T_A$ may be minimized while increasing $T_E$ at the same time.

The embodiment under consideration concerns the case in which the tracking signals are recorded only in the overlapped portion $Q_1$ of FIG. 15. The present embodiment, however, is not limited to such a construction, but the overlapped portion $Q_2$ may be used also for recording the tracking signals, or the tracking signals may be recorded at a plurality of points of the overlapped portions $Q_1$, $Q_2$. Also, instead of the overlapped portions $Q_1$, $Q_2$, the vertical blanking position of the recorded video signal may be used for recording the tracking signals, in which case an interference of the tracking signal with the video signal, if any, does not appear on the reproduced picture since the recorded position is during the vertical blanking period.

The embodiment under consideration may be applied not only to the case in which the main signal to be recorded is the video signal but also to the case in which the signal to be recorded is a PCM signal digitized from the video signal or audio signal or other desired signal.

Further, the case shown in FIG. 13 wherein the tape 1 is wound on the disc 2 at the angle of 180 degrees with a couple of heads is not the only application of the present embodiment but the embodiment is applicable also to a system comprised of a given number of magnetic heads with a desire angle of winding. Furthermore, the recording position of the tracking signals is not limited to the overlapped portions but, in an apparatus with such a winding angle and such a number of heads as to eliminate any overlaps, for example, the tracking signals may be recorded in time division along the longitudinal direction of the tracks in a recording region separate from that for the main signal.

Figure 19:
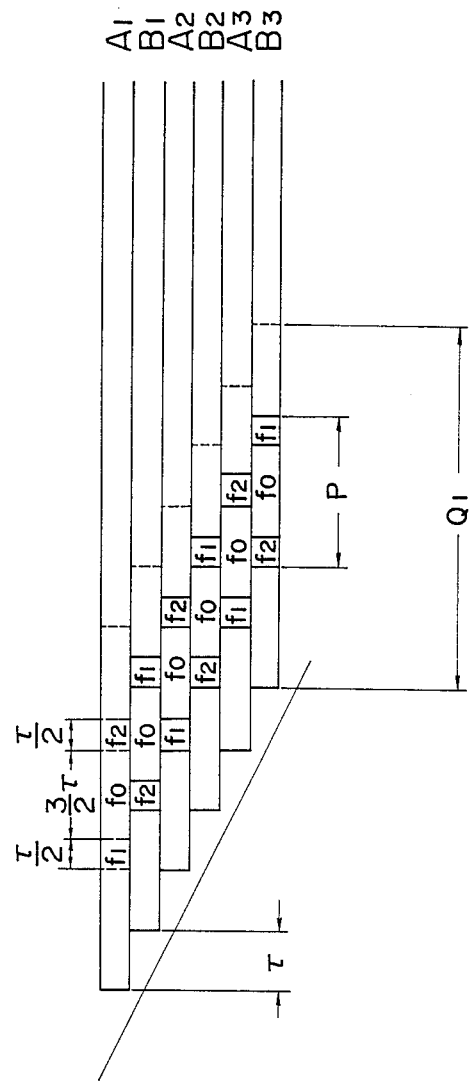
FIG. 19 shows a modified tape pattern for FIG. 13.

In the aforementioned embodiment, the tracking signals $f_0$, $f_1$, $f_2$ are recorded for the time equal to the displacement distance $\tau$ of adjacent tracks at track end. The present embodiment is, however, applicable also to the case in which the signals $f_1$ and $f_2$ are recorded for the time length shorter than $\tau$, while the signal $f_0$ is recorded longer than $\tau$, in such a manner as shown by the example of FIG. 19 wherein $f_1$, $f_2$ is recorded for the time $\tau/2$ and the signal $f_0$ for the time $3/2 \tau$ so that larger recording areas are provided for the main signal with small areas for the tracking signals.

Figure 20:
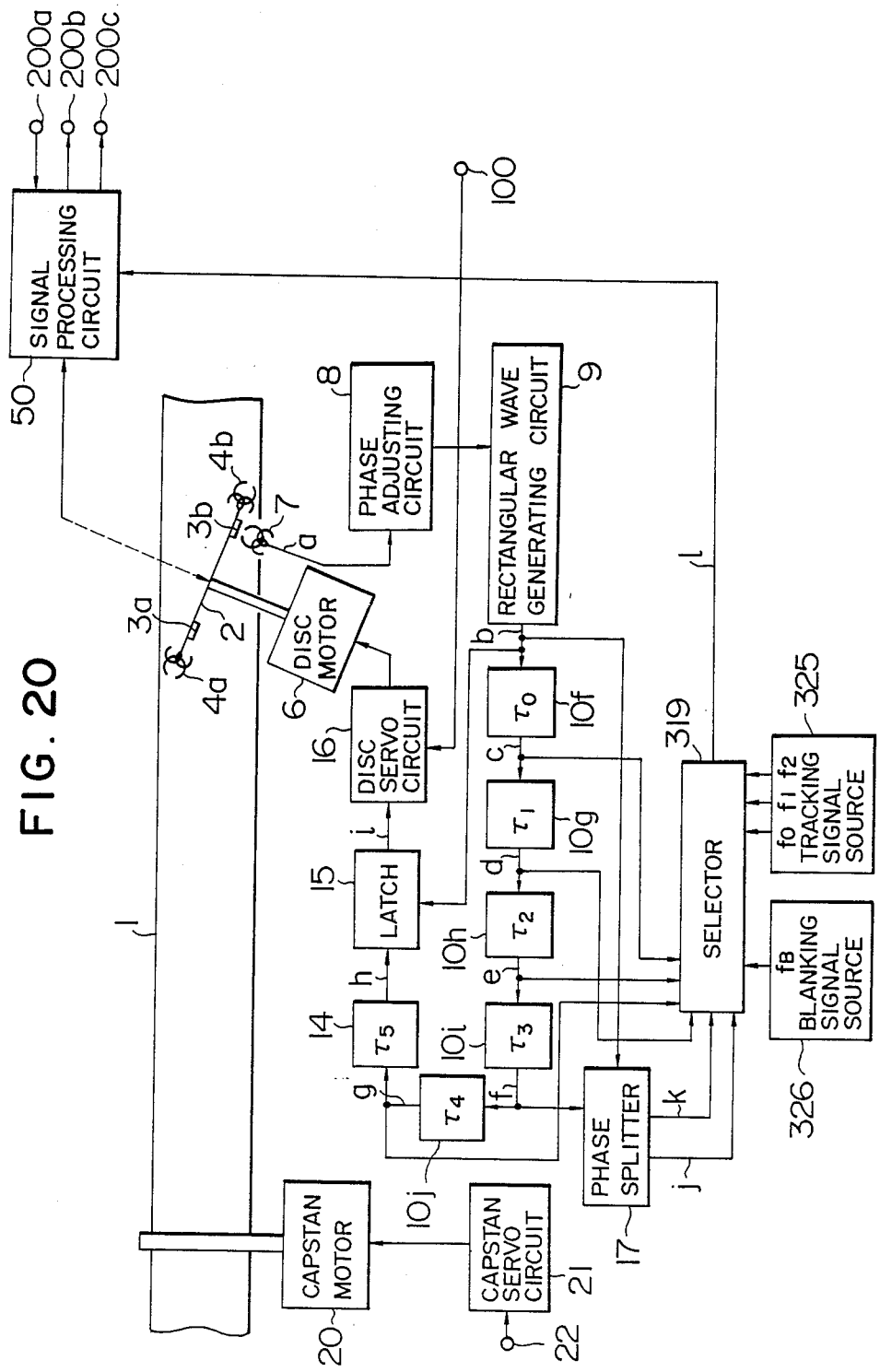
FIG. 20 is a diagram showing a servo control in another embodiment of the present invention.
Figure 21:
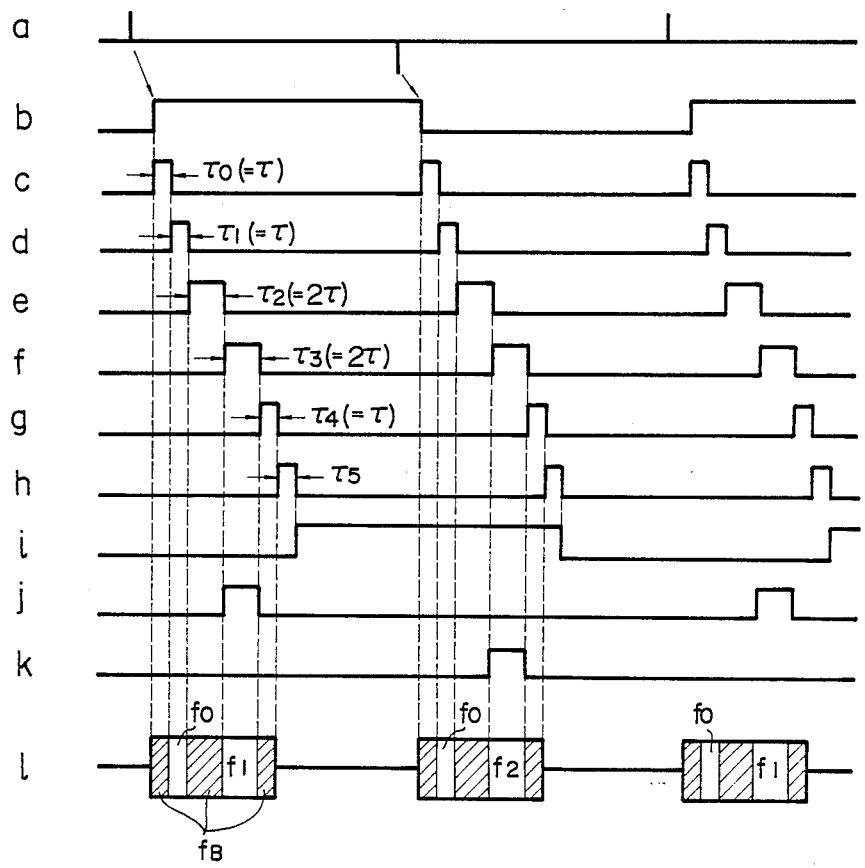
FIG. 21 are waveforms produced at various parts in FIG. 20.
Figure 22:
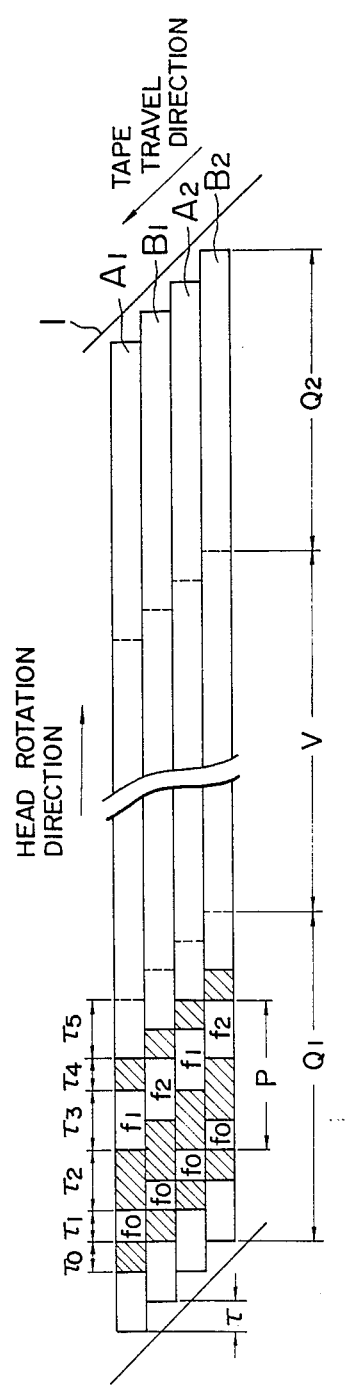
FIG. 22 shows a track pattern for FIG. 20.
Figure 23:
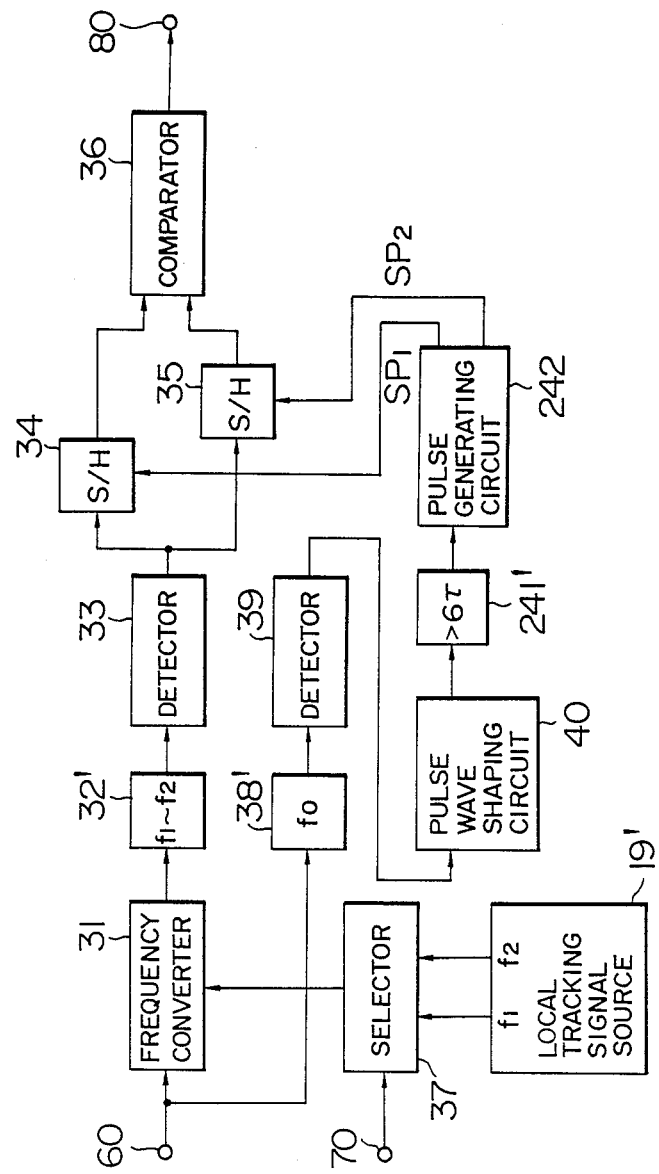
FIG. 23 is a diagram showing a tracking control in another embodiment of the present invention.
Figure 24B:
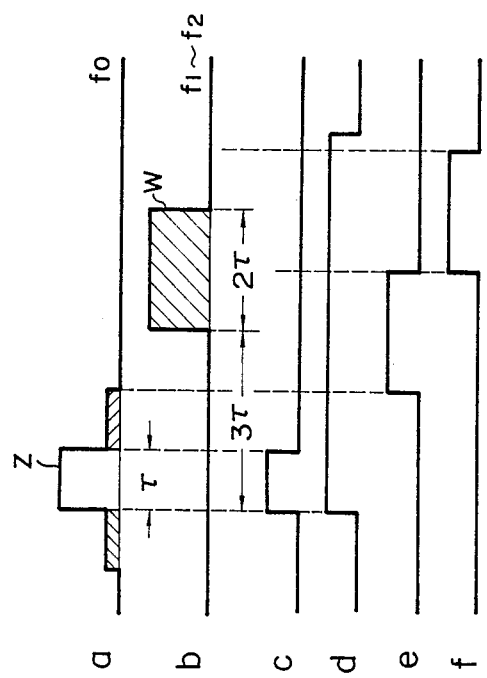
FIGS. 24A, 24B show waveforms produced in the tracking control in FIG. 23.
Figure 24A:
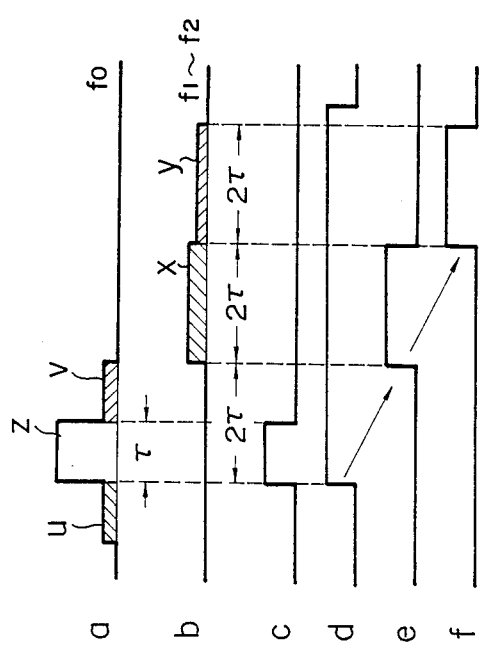

Another embodiment of the present invention will be described below with reference to FIG. 20. FIG. 20 is a diagram showing the servo control for recording in which the present invention is applied to the rotary head type helical scan VTR. FIG. 21 shows waveforms for explaining the operation of the circuit of FIG. 20. FIG. 22 shows a track pattern formed by recording. FIG. 23 shows an embodiment of the tracking control system for reproduction, and FIGS. 24A, 24B show waveforms produced at various parts for explaining the operation of the system shown in FIG. 23.

In FIG. 20, a magnetic tape 1 is driven by a capstan motor 20 which in turn is controlled in the rotational motion thereof to a predetermined speed by a capstan servo circuit 21. Magnetic heads 4a and 4b have different azimuth angles from each other, and being mounted at an angle of 180 degrees to each other on the disc 2, are rotated together with the disc 2 by the disc motor 6. Since the tape 1 is wound on the disc 2 more than 180 degrees, what is called the overlapped portions indicated by $Q_1$ and $Q_2$ in FIG. 22 are formed on the track, with which the magnetic heads 4a and 4b are in contact at the same time. The disc 2 has a couple of magnets 3a and 3b at an angle of 180 degrees to each other, which are detected by a tachometer head 7 to produce a pulse a (a of FIG. 21) in phase with the rotation of the magnetic heads 4a, 4b from the tack head 7. The pulse a from the tack head 7 phase adjusted by a phase regulator circuit 8 in such a manner that the magnetic heads 4a, 4b are in relative positions with the tape 1, after which the output of the phase regulator circuit 8 is applied to a rectangular wave generator circuit 9. The circuit 9 produces a pulse b (b of FIG. 6) with the duty factor of 50% synchronous with the rotation of the magnetic heads 4a, 4b. Numeral 10f designates a delay circuit triggered at both the leading and trailing edges of the pulse b from the circuit 9 to produce a pulse c (c of FIG. 21) of predetermined time width $\tau$ of given value. In this case, the value $\tau_o$ is set equal to the value $\tau$ associated with the displacement distance of adjacent tracks at track end. A delay circuit 10g which is triggered at the trailing end of the pulse c from the circuit 10 produces a pulse d (d of FIG. 21) of a predetermined duration $\tau_1$. The value of $\tau_1$ is determined to be equal to the value of $\tau$. A delay circuit 10h, on the other hand, which is triggered at the trailing edge of the pulse d from the circuit 10g, produces a pulse e (e of FIG. 21) of a predetermined duration $\tau_2$, the value of which is determined to be equal to $2\tau$. Further, a delay circuit 10i, triggered at the trailing edge of the pulse e from the circuit 10h, produces a pulse f (f of FIG. 21) of a predetermined duration $\tau_3$. The value of $\tau_3$ is made equal to $2\tau$. A delay circuit 10j, triggered at the trailing edge of the pulse f from the circuit 10i, produces pulse g (g of FIG. 21) of a predetermined duration $\tau_4$, the value of which may be determined as desired and is made equal to $\tau$ in the case under consideration. In similar fashion, a delay circuit 14, triggered at the trailing edge of the pulse g from the circuit 10j, produces a pulse h (h of FIG. 21) of a predetermined duration $\tau_5$.

Numeral 15 designates a latch circuit for latching the pulse b from the circuit 9 at the trailing edge of the pulse h from the circuit 14 and thus producing a pulse i (i of FIG. 12) delayed from the pulse b of the circuit 9 by the time length $\tau_0+\tau_1+\tau_2+\tau_3+\tau_4+\tau_5$. The pulse i from the circuit 15 is applied to one terminal of the disc servo circuit 16, the other terminal of which is supplied with a vertical sync signal of frame period for the video signal to be recorded as a reference signal for the disc servo system from the terminal 100. The disc servo circuit 16 compares the pulse i from the circuit 15 with the reference signal from the terminal 100, and produces a phase error signal therebetween, which phase error signal is applied to a disc motor 6. As a result, the system is subjected to servo control in such a manner that the pulse i is synchronized with the reference signal, so that the magnetic heads 4a, 4b are rotated at a rotational speed equal to the frame frequency.

Numeral 50 designates a video signal processing circuit, of which the terminal 200a is supplied with a video signal to be recorded. The video signal, after being appropriately processed at the circuit 50, is densely recorded without any guard band on the tracks A and B in FIG. 22 by the mgnetic heads 4a, 4b under the above-mentioned servo control.

Numeral 17 designates a phase splitter for dividing the pulse f from the circuit 10i into two phases by the pulse b from the circuit 9, so that the pulse j (j of FIG. 21) is produced when the pulse b is "high" and the pulse k (k of FIG. 21) when the pulse b is "low". Numeral 325 designates a tracking signal source for generating at least two tracking signals of different frequencies, here, three tracking signals $f_0$, $f_1$ and $f_2$. The frequencies of these tracking signals are determined in such a manner that the azimuth loss is comparatively samll against the azimuth angles of the magnetic heads 4a, 4b, that is, in such a manner that the tracking signals $f_1$ and $f_2$ have different frequencies and that the tracking signal $f_0$ has a given frequency. Numeral 326 designates a blanking signal source for generating a blanking signal $f_B$ with a frequency different from the tracking signals $f_0$, $f_1$, $f_2$, such as a frequency with a sufficiently large azimuth loss as against the azimuth angle of the magnetic heads 4a, 4b.

Numeral 319 designates a selector circuit for selecting the tracking signal $f_0$ from the circuit 325 only during the period of the pulse duration $\tau_1 (=\tau)$ of the pulse d in response to the same pulse applied from the circuit 10g, selecting the tracking signal $f_1$ only during the period of the pulse duration $\tau_3 (=2\tau)$ of the pulse j in response to the same pulse applied from the circuit 17, and selecting the tracking signal $f_2$ only during the period of the pulse width $\tau_3 (=2\tau)$ of the pulse k in response to the same pulse applied from the circuit 17. Further, the blanking signal $f_B$ is selected by the selector circuit 319 from the circuit 326 during the period of the respective pulses c, e and g from the circuits 10f, 10h and 10j respectively. The tracking signals and the balnking signal thus selected are arranged in a time series. Specifically, the circuit 319 produces at the output terminal l thereof (l of FIG. 21) the tracking signals $f_0$ and $f_1$ in that order during the "high" state of the pulse b, the tracking signals $f_0$ and $f_2$ in that order during the "low" state of the pulse b, in both cases with the blanking signal $f_B$ inserted in burst form before and after each tracking signal. The output signal l from the circuit 319 is recorded in the region P of the overlapped portion $Q_1$ of the tracks A and B shown in FIG. 22 through the circuit 50.

Now, reference is made to FIG. 22. The displacement ($\tau$ in FIG. 22) of adjacent tracks at the track end is determined in accordance with the rotational speed of the magnetic heads 4a, 4b and the travel speed of the tape 1, and is given as $\tau$ representing the length of time of scanning by the magnetic heads. The tracking signal $f_0$, on the other hand, is recorded for the time length equal to the amount of track misalignment $\tau$ as mentioned above with reference to FIG. 21, and the tracking signals $f_1$ and $f_2$ are recorded for the time length $2\tau$ after the time $2\tau$ twice the displacement distance following the tracking signal $f_0$. As a result, as shown in FIG. 22, the recording start point of the tracking signal $f_1$ or $f_2$ on the track coincides with the recording finish point of the tracking signal $f_0$ on the track next but one on the one hand, and the recording finish point of the tracking signal $f_1$ or $f_2$ coincides with the recording start point of the tracking signal $f_1$ or $f_2$ on the track next but one on the other hand.

As seen from the pattern shown in FIG. 22, even though the recording positions of the tracking signals $f_1$ and $f_2$ are partially overlapped between adjacent tracks along the direction perpendicular to the longitudinal direction of the tracks, the tracking signals $f_1$ are not overlapped one on the other, nor are the tracking signals $f_2$, between a track and another track next but one. Also, when the tracking signals $f_1$ and $f_2$ are recorded in these recording positions, the recording positions of the tracking signal $f_0$ are not overlapped between an adjacent track and a track adjacent but one, so that the tracking signals $f_0$ are not overlapped between such tracks along the direction perpendicular to the longitudinal direction of the tracks.

FIG. 23 is a diagram showing the track control for reproduction using the above mentioned tracking signals. The operation of the control will be described with reference to the waveform diagrams of FIGS. 24A and 24B. The servo control unit for reproduction which is not shown share most parts with the servo control unit for recording shown in FIG. 20, the only differences for reproduction being that the circuit 17, 319 or 326 is not used, that the terminal 100 is supplied with a predetermined reference signal of frame frequency in place of the vertical sync signal of frame period, that the tracking error signal from the tracking control unit in FIG. 23 described later is applied to the terminal 22 whereby the capstan motor 20 is controlled through the capstan servo circuit 21, and that the video signal and the tracking signals reproduced at the magnetic heads 4a, 4b from the magnetic tape 1 are appropriately processed at the video signal processing circuit 50 with the reproduced video signal and the reproduced tracking signals produced at the terminals 200b and 200c respectively. The operation of the circuit of FIG. 23, therefore, will be explained partially by reference to FIG. 20.

In FIG. 20, since the reference signal of frame frequency is applied to the terminal 100 in reproduction mode, the pulse i from the circuit 15 is subjected to servo control in phase with the reference signal in the same manner as mentioned above, so that the magnetic heads 4a, 4b are driven at the same rotational speed equal to the frame frequency as in recording mode. The signals reproduced alternately from the tape 1 by the magnetic heads 4a, 4b after being sufficiently amplified at the circuit 50, are separated into the video signal and the tracking signals, with a result that the reproduced tracking signals are produced at the terminal 200c.

In FIG. 23, numeral 19' designates a local tracking signal source, which may be common to the source 325 shown in FIG. 20. Numeral 37 designates a selector circuit, first and second input terminals of which are supplied with the local tracking signals $f_1$ and $f_2$ from the source 19', a third input terminal thereof being supplied with the pulse b from the rectangular wave generator circuit 9 of FIG. 20 through the terminal 70. This selector circuit 37 selects the local tracking signal $f_1$ during the scanning of the tape by the magnetic head 4a under the "high" state of the pulse b, that is, during the period when the tracking signal $f_1$ is selected in recording mode; while the circuit 37 selects the local tracking signal $f_2$ during the scanning of the tape by the magnetic head 4b under the "low" state of the pulse b, that is, during the period when the tracking signal $f_2$ is selected in recording mode. In any of these cases, the local tracking signals $f_1$ and $f_2$ are selectively produced at least during the scanning of the tracking region P of FIG. 22, and any local tracking signal is not produced during the remaining periods. The output from this circuit 37 is supplied to one of the terminals of the frequency converter circuit 31 as a local tracking signal. The other input terminal of the frequency converter circuit 31 is supplied with the reproduced tracking signal from the terminal 200c of FIG. 20 through the terminal 60. The reproduced tracking signal from the terminal 60 is frequency-converted at this frequency converter circuit 31 by the local tracking signal from the circuit 37, and an error frequency component therebetwen is produced from the circuit 31.

In FIG. 22, when the magnetic head scans the same track as in recording, such as when the magnetic head 4b scans the track $B_1$ carrying the tracking signals $f_0$ and $f_2$ (the associated waveforms produced at various parts of FIG. 23 being shown in FIG. 24A), then the tracking signals $f_0$ and $f_2$ are reproduced from track $B_1$ at the tracking signal region P. From the adjacent tracks $A_1$ and $A_2$, on the other hand, the tracking signals $f_0$ and $f_1$ are detected as crosstalks. These crosstalks from the adjacent tracks, as seen from the pattern shown in FIG. 22, have different timings of detection, one displaced by $2\tau$ from the other in timing, and therefore they are never overlapped in timing. During the scanning by the magnetic head 4b, by contrast, the local tracking signal $f_2$ is produced from the circuit 37, and the reproduced tracking signals from the main track and the adjacent tracks are frequency-converted at the circuit 31 by the local tracking signal $f_2$, and therefore the circuit 31 produces the frequency components $f_0-f_2$ and $f_1-f_2$ as an error. Of these components, only the component $f_1-f_2$ is extracted by the filter 32' and the envelope thereof is detected by the detector circuit 33. Since the error frequency between the tracking signal $f_2$ on the main track $B_1$ and the local tracking signal $f_2$ is zero, the detector circuit 33 produces no output. Also, as mentioned above, when the tracking signals $f_1$ and $f_2$ are recorded in the recording positions thereof, the recording positions of the tracking signal $f_0$ are not overlapped between an adjacent track and the track next but one along the direction perpendicular to the longitudinal direction of the tracks, and therefore the two frequency components $f_0-f_2$ and $f_1-f_2$ are not detected at the same timing from the circuit 31, so that the component $f_1-f_2$ alone can be detected with high S/N ratio without any unnecessary components. The detector circuit 33, on the other hand, produces only the output based on the tracking signals $f_1$ from the adjacent tracks $A_1$ and $A_2$ during the period $2\tau$ alternately displaced by time $2\tau$ from each other as shown by x and y in b of FIG. 24A. The output of the detector circuit 33 contains the crosstalks from the adjacent circuits and the output levels x and y thereof correspond to the amount of the tracking error. In the case where the scanning center is deviated toward the track $A_1$ against the main track $B_1$, for example, the detection level x during the first period $2\tau$ increases and the detection level y during the next period $2\tau$ decreases, while if the scanning center is displaced toward the other adjacent track $A_2$, the opposite is the case. By comparing the detection levels x and y, therefore, it is possible to detect the polarity indicating the direction of displacement and the amount of the tracking error. The output of the circuit 33 is applied to one of the terminals of each of the sample hold circuits 34 and 35.

Numeral 38' designates a filter circuit for extracting the tracking signal $f_0$ in response to the reproduced tracking signal from the terminal 60. The output of this filter 38' is applied to the detector circuit 39 where the envelope thereof is detected. The detector circuit 39 produces, as shown in a of FIG. 24A, an output z based on the tracking signal $f_0$ from the main track $B_1$ and outputs u and v based on the tracking signals $f_0$ from the adjacent tracks $A_1$ and $A_2$ during the period $\tau$. In this case, took the tracking signals $f_1$ and $f_2$ are not detected simultaneously, and therefore the tracking signal $f_0$ alone can be detected with high S/N ratio. The output of the detector circuit 39 is shaped to an appropriate threshold value at the pulse shaping circuit 40 to produce a pulse (c of FIG. 24A) associated with the output z based on the tracking signal $f_0$ of the main track. Numeral 241' designates a delay circuit having a delay time of $6\tau$, which circuit is triggered at the leading edge of the pulse from the circuit 40. Since the delay time is set to $6\tau$ or more, an errorneous detection, if any, confusing the tracking signal $f_0$ with the tracking signal $f_1$ or $f_2$ for reproduction, is inhibited to prevent false actuation. In other words, the tracking signal $f_0$ may be set to the same frequency as the tracking signal $f_1$ or $f_2$, or to a given frequency in general cases. The output pulse (d of FIG. 24A) of this circuit 41 is applied to the sampling pulse generating circuit 242 to produce a couple of sampling pulses $SP_1$ and $SP_2$. The first sampling pulse $SP_1$ (e of FIG. 24A) is generated in a phase delayed by $2\tau$ from the leading edge of the pulse from the circuit 241 so that the pulse duration thereof is $2\tau$ or less. The second sampling pulse $SP_2$ (f of FIG. 24A), on the other hand, is generated with a time delay of about $2\tau$ from the first sampling pulse $SP_1$. This first sampling pulse $SP_1$ is applied as a sampling pulse for the circuit 34, so that the circuit 34 produces an error voltage based on the tracking error from one of the adjacent tracks $A_1$. The second sampling pulse $SP_2$, on the other hand, is supplied for the circuit 35, so that the circuit 35 produces an error voltage based on the tracking error from the other adjacent track $A_2$. The error voltages from these circuits 34 and 35 are compared with each other at the voltage comparator circuit 36, the output of which is applied through the terminal 80 to the terminal 22 of the capstan servo circuit 21 of FIG. 20 as a tracking error signal, thereby controlling the capstan motor by negative feedback.

The aforementioned operation is also performed in the case where the magnetic head 4a with the azimuth angle as the main track $A_2$ scans the main track $A_2$ following the main track $B_1$, in which case the only difference is that the circuit 37 selects the local tracking signal $f_1$, the same waveforms being produced at corresponding parts. By this operation, tape driving speed is controlled for tracking control in such a way that the center of the main track is scanned, that is, the amounts of crosstalks of the tracking signals from the adjacent tracks are equal to each other.

In the case of "inverted tracking", such as when the magnetic head 4a scans the track $B_1$ different from the track scanned thereby for recording, the waveforms shown in FIG. 23 are produced in the forms shown in FIG. 24B. In this case, with the signal $f_1$ selected as a local tracking signal, the track $B_1$ recorded with the tracking signals $f_0$ and $f_2$ is scanned, and therefore the circuit 39 produces the sampling pulses $SP_1$ and $SP_2$ (e and f of FIG. 24B) in response to the output z based on the tracking signal $f_0$ from the circuit 39 under scanning. The circuit 33, on the other hand, detects the component $f_1 \sim f_2$ (w of FIG. 24B) based on the tracking signal $f_2$ from the track $B_1$ being scanned, but not the tracking error data based on the tracking signals $f_1$ from the adjacent tracks $A_1$ and $A_2$. As seen from the waveforms shown in FIG. 24B, therefore, the output voltage of the circuit 34 fails to coincide with that of the circuit 35. Instead, they are unbalanced with each other, resulting in a large error voltage being produced from the circuit 36. This clearly indicates that the system never settles under the inverted tracking state, but a large error signal functions to restore the normal tracking condition, thus shortening the pull-in time of the system. This function is obtained by switching the local tracking signals $f_1$ and $f_2$ in accordance with the scanning by tee magnetic heads. In other words, this function permits automatic track identification.

The blanking signal $f_B$ recorded adjacent to the tracking signal $f_0$ and the tracking signal $f_1$ or $f_2$ (at the position shown by the hatched portion in FIG. 22), which is not engaged directly in the detection of the tracking error signal, is used to erase the tracking signal recorded over the adjacent tracks or to erase the unnecessary signals already recorded, in the case where heads wider than the track pitch are used as the magnetic heads 4a, 4b. Further, the blanking signals are effective in preventing mutual interference among the tracking signals. This makes it possible to detect the desired tracking signals with even higher S/N ratio.

The video signals reproduced alternately by the magnetic heads 4a, 4b from the video signal recording region V of FIG. 22 are switched therebetween at the video signal processing circuit 50 in response to the pulse i from the circuit 15 of FIG. 20 thereby to produce a single continuous reproduced video signal from the terminal 200b, without any reproduced tracking signal mixed therewith. As seen from the foregoing description, the tracking signals recorded in the overlapped portion $Q_1$ of FIG. 22 is completely separated from the reproduced video signal, and therefore the recording level thereof can be improved sufficiently, so that a reproduced tracking signal with a sufficiently high S/N ratio is produced thereby to permit stable tracking control.

Further, according to the present invention, the tracking signals are arranged in relation to the displacement distance $\tau$ of adjacent tracks at track ends, and the displacement distance $\tau$ may be determined to a desired value without any limitation unlike in the prior art. Furthermore, this arrangement in relation to the displacement distance & reduces the recording region of the tracking signals on the one hand and maximizes the amount of the tracking error signal obtained in a given time on the other hand. For comparison with the prior art, assume that the track end displacement is $\tau=1.5H$. The recording period $T_A$ of the tracking signals required for obtaining at least one tracking error data is given as $$T_A = 5\tau = 7.5H \quad (13)$$

On the other hand, the time $T_E$ for obtaining the tracking error signal for each detection of the error is expressed as $$T_E = 2\tau = 3.0H \quad (14)$$

As obvious from comparison of equations (13) and (14) with equations (1) to (4), it is possible according to the present invention to maximize the value $T_E$ without increasing the value $T_A$. The fact that the value $T_E$ can be increased, in particular, indicates a greater amount of tracking error data detected in a given time. At the same time, an accumulated effect over a time improves the accuracy and stability of the tracking control.

It will be clear from the aforementioned operation according to one aspect of the present embodiment, tracking signals $f_1$ and $f_2$ for detecting a tracking error amount and a tracking signal $f_0$ for detecting the positions thereof are recorded in recording regions which are arranged in relation to the track end displacement $\tau$ of adjacent tracks at track ends in such a manner that the recording positions of the tracking signals are not overlapped with each other between the adjacent track and the track adjacent but one along the direction perpendicular to the length of the tracks, whereby the tracking signals can be detected with high S/N ratio without any mutual interference therebetween. According to another aspect of the present embodiment, tracking signals (the tracking signals $f_1$ or the tracking signals $f_2$) for detecting the amount of a tracking error are arranged in a manner not to be overlapped between a track and the track next but one along the direction perpendicular to the length of the tracks on the one hand, and the tracking signals $f_0$ for detecting the positions thereof are arranged in a manner not to be overlapped between the adjacent track and the adjacent track but one, whereby the tracking signals $f_0$, $f_1$ and $f_2$ can be detected with a high S/N ratio without any mutual interference. Track patterns according to other embodiments of the present invention other than that shown in FIG. 22 are shown in FIGS. 25A and 25B.

Figure 25A:
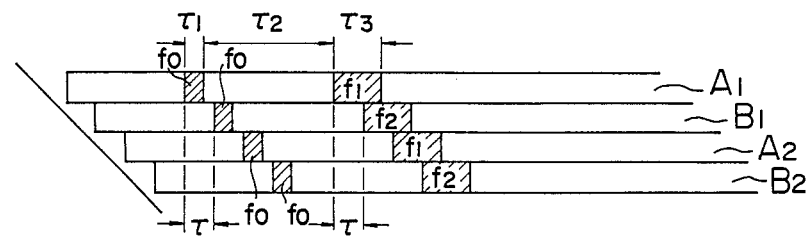
FIGS. 25A and 25B show modified track patterns for FIG. 20.
Figure 25B:
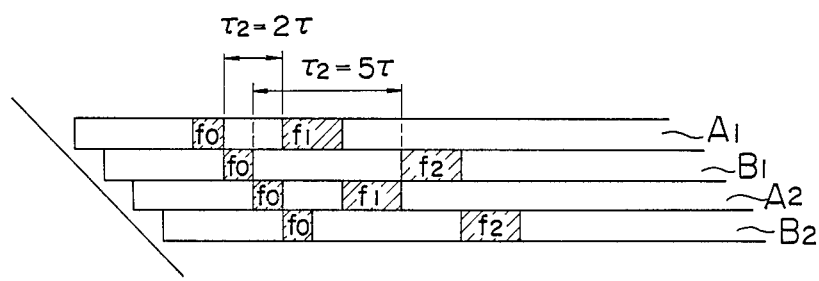

FIG. 25A shows a track pattern in which the delay times $\tau_1$, $\tau_2$ and $\tau_3$ of the circuits $10g$, $10h$ and $10i$ respectively are given in the relation $\tau_1 < \tau$, $\tau_2 > 2\tau$, and $\tau_3 < 2\tau$. FIG. 25B, on the other hand, shows a track pattern obtained by setting the delay time $\tau_2$ of the circuit $10h$ of FIG. 20 to $2\tau$ for track A and to $5\tau$ for track B alternately. Especially according to the embodiment shown in FIG. 25B, the recording positions of the tracking signals $f_1$ and $f_2$ are different from one track to another, so that they are not overlapped between adjacent tracks. As a result, the right amount tracking error can be detected even when the signals $f_1$ and $f_2$ have the same frequency. Further, since the frequency of the tracking signal $f_0$ can be selected as desired, the same signal may be used for the tracking signals $f_0$, $f_1$ and $f_2$. In this case, the different timings of reproduction of the tracking signals $f_1$ and $f_2$ from one track to another with reference to the tracking signal $f_0$ may be used for automatic track identification.

Apart from the aforementioned embodiment in which only the overlapped portion $Q_1$ of FIG. 22 is used for recording the tracking signals, the present embodiment is not to such a case, but the tracking signals may be recorded also in the overlapped portion $Q_2$ or may be recorded at a plurality of points in the overlapped portions $Q_1$ and $Q_2$. Further, instead of these overlapped portions $Q_1$ and $Q_2$, the vertical blanking position of the recorded video signal may be used for recording the tracking signals, in which case an interference of a tracking signal with the video signal if any, does not appear on the reproduced picture since the recording position of the tracking signals lies in the vertical blanking period. Also, the present embodiment is not limited to the video signal as the main signal to be recorded but may be applied with equal effect to a PCM signal digitized from the video signal or audio signal or other given signal. Furthermore, instead of the winding angle of 180 degrees at which the tape 1 is wound on the disc 2 in FIG. 20, a desired winding angle and a given number of magnetic heads may be used. What is more, the recording position of the tracking signals is not limited to the overlapped portions, but in such an apparatus so constructed that there is no overlapped portion, for instance, the tracking signals may alternatively be recorded by time division in a recording region separate from that for the main signal along the length of the tracks. Also, the tracking signals may be recorded either directly or with the main signal or other signal as a bias. In any of the aforementioned cases, the object of the present embodiment is satisfied to equal effect.

Furthermore, although the tracking control signal is supplied to the capstan servo circuit 21 in the description so far made, the tracking signal may be alternately supplied to the disc servo circuit 6 or the like to adjust the rotation speed of the heads to achieve the tracking control. Additionally, generation of the tracking error signals constituting the tracking control signal is also achieved, without making use of the local tracking signal, by directly comparing the amounts of crosstalk detected from two adjacent tracks to one track being scanned by one of the heads in the reproducing operation mode.

We claim:

1. A rotary head type magnetic recording and reproducing apparatus comprising:

a plurality of rotary heads mounted on rotary head carrying means and arranged for scanning parallel, oblique tracks of a magnetic tape for signal recording and reproduction with a predetermined displacement distance between the track scanning start ends of two adjacent tracks as measured in a direction perpendicular to the longitudinal direction of the tracks;

means for driving said head carrying means;

means for driving said magnetic tape;

means for processing signals to be supplied to and from said heads so that said signals are properly recorded on and reproduced from the tracks of said tape;

means for generating a head position signal in synchronism with rotation of said rotary heads, said head position signal containing a plurality of scanning start pulses each representative of the time point when one of said heads is located at the scanning start end of one of said tracks;

signal source means capable of generating at least two different frequencies;

means connected with said head position signal generating means for generating two first gate pulse signals starting, respectively, upon elapse of first and second time periods from scanning start pulses for odd-numbered and even-numbered tracks;

means connected with said first gate pulse signal generating means for generating a second gate pulse signal for odd-numbered tracks in a first timed relation with the associated one of said first gate pulse signals and for generating a third gate pulse signal for even-numbered tracks in a second timed relation with the other one of said first gate pulse signals under control of said head position signal received from said head position signal generating means;

selection means connected with said signal source means and with said first gate pulse signal generating means and said second and third gate pulse signal generating means to deliver a first signal having a first one of said different frequencies of said signal source means during the width of said first gate pulse signals as a first tracking signal, a second signal having a second one of said different frequencies during the width of said second gate pulse signal as a second tracking signal and a third signal having one of said different frequencies and being different from said first one frequency during the width of said gate pulse signal as a third tracking signal, said signal processing means being arranged to receive the output of said selection means for recording of said first and second tracking signals on odd-numbered tracks and said first and third tracking signals on even-numbered tracks of said magnetic tape through said magnetic heads and to receive from said heads and process reproduced signals containing information signals, tracking signals and crosstalk signals of the tracking signals; and tracking control circuit means interconnected between said signal processing means and either one of said magnetic tape drive means and said head carrying means drive means, said tracking control circuit means including (a) means connected with said signal processing means for extracing a reproduced first tracking signal for each track from the processed reproduction output of said signal processing means, (b) means connected with said signal processing means for alternately producing first and second crosstalk detection signals from even-numbered tracks and third and fourth crosstalk detection signals from odd-numbered tracks on the basis of the crosstalks contained in the processed reproduction output of said signal processing means, (c) means connected with said reproduced first tracking signal extracting means for generating a sampling signal on the basis of said reproduced first tracking signal, and (d) means for alternately comparing said first and second crosstalk detection signals and said third and fourth crosstalk detection signals by the use of said sampling signal to produce a tracking control signal to be fed to either one of said drive means.

2. An apparatus according to claim 1, in which said crosstalk detection signal producing means is constituted by means for extracting reproduced crosstalk signals from the processed reproduction output of said signal processing means and delivering the extracted reproduced crosstalk signals to said comparing means as said crosstalk detection signals.

3. An apparatus according to claim 1, in which said crosstalk detection signal producing means includes a mixer in an electrical connection for receiving the processed reproduction output of said signal processing means and a local oscillation circuit capable of generating at least two different frequencies and arranged to successively and cyclically supply to said mixer local oscillation signals of said different frequencies under control of said head position signal received from said head position signal generating means so that said mixer serially produces frequency difference signals between said crosstalk signals in said processed reproduction output and the output of said local oscillation circuit and delivers said difference frequency signals to said comparing means as said crosstalk detection signals.

4. An apparatus according to claim 1, in which said signal source means is capable of generating two different frequencies so that the frequency of said third signal is equal to that of said second signal in the output of said selection means.

5. An apparatus according to claim 1, in which said signal source means is capable of three different frequencies so that the frequency of said third signal is also different from that of said second signal in the output of said selection means, said second and third gate pulse signal generating means is in such a structure and is in such an arrangement with respect to said first gate pulse generating means that said first gate pulse signal is followed by said second gate pulse signal without any time interval therebetween for odd-numbered tracks and is followed by said third pulse signal without any time interval therebetween for even-numbered tracks.

6. An apparatus according to claim 5, in which:

said apparatus further comprises means connected between said head position signal generating means and said first gate pulse signal generating means for generating fourth and fifth gate pulse signals for odd-numbered and even-numbered tracks starting upon elapse of a second time period from each of said scanning start pulses and continues until said starting of said first gate pulse signal, said fourth and fifth gate pulse signals being also supplied to said selection means so that it delivers said third and second signals during the widths of said fourth and fifth gate pulse signals as fourth and fifth tracking signals, respectively;

said crosstalk detection signal producing means includes a mixer in an electrical connection for receiving the processed reproduction output of said signal processing means and a local oscillation circuit capable of generating a frequency equal to the frequency of said first tracking signal and arranged to supply to said mixer a local oscillation signal having a frequency equal to said first tracking signal frequency under control of said first gate pulse signal received from said first gate pulse signal generating means so that said mixer simultaneously produces two difference frequency signals between said crosstalk signals in said processed reproduction output and the output of said local oscillation circuit for each track and delivers said difference frequency signals to said comparing means as said crosstalk detection signals; and said comparing means includes a comparator for comparing said two difference frequency signals and an inverter for reversing the output of said comparator under control of said head position signal received from said head position signal generating means to generate said tracking control signal.

7. An apparatus according to claim 1, in which:

said signal source means is capable of generating three different frequencies so that the frequency of said third signal is also different from that of said second signal in the output of said selection means, said second and third gate pulse signal generating means is in such a structure and is in such an arrangement with respect to said first gate pulse generating means that said first gate pulse signal is followed by said second gate pulse signal with a first time interval therebetween for odd-numbered tracks and is followed by said third pulse signal with a second time interval therebetween for even-numbered tracks; and said apparatus further comprises sixth gate pulse signal generating means interconnected between said head position signal generating means and said first gate pulse signal generating means, seventh gate pulse generating means interconnected between said first gate pulse signal generating means and said second and third gate pulse signal generating means and eighth gate pulse signal generating means interconnected between said second and third gate pulse signal generating means and said head carrying means drive means, and comprises second signal source means capable of generating a blanking signal having such a high frequency that it suffers from a large azimuth loss when reproduced, after having been recorded on the tape, by the heads, all of the outpus of said sixth, seventh and eighth gate pulse signal generating means being also supplied to said selection means so that it delivers said blanking signal during the widths of said sixth, sventh and eighth gate pulse signals, respectively, the width of said seventh gate pulse signal alternately corresponding to said first and second time intervals for odd-numbered and even-numbered tracks.

8. A method of producing a tracking control signal in a rotary head type magnetic recording and reproducing apparatus having a plurality of rotary heads arranged for scanning parallel, oblique tracks of a magnetic tape for signal recording and reproduction with a predetermined displacement distance between the track scanning start ends of two adjacent tracks as measured in a direction perpendicular to the longitudinal direction of the tracks, the method comprising the steps of:

recording a first record position detecting signal and a first tracking signal on a first portion and a second portion, respectively, of a series of first tracks, said first tracks being predetermined ones of said parallel, oblique tracks which are spaced from one another, said first record position detecting signal and said first tracking signal having frequencies different from each other, said first and second portions of said first tracks being at different locations so as to not overlap each other, and recording a second record position detecting signal and a second tracking signal on a first portion and a second portion, respectively, of a series of second tracks, said second tracks being other predetermined ones of said parallel, oblique tracks which are spaced from one another so as to be interleaved with said first tracks so that said first tracks are adjacent to said second tracks, said second record position detecting signal and said second tracking signal having frequencies different from each other, said first and second portions of said second tracks being at different locations so as to not overlap each other, wherein at least parts of the first portions of two tracks of one of said first and second tracks which are adjacent to any one of the other of said second and first tracks do not overlap with each other as viewed in said direction perpendicular to the track longitudinal direction, at least parts of the second portions of the two tracks of one of said first and second tracks which are adjacent to any one of the other of said second and first tracks do not overlap with each other as viewed in said direction perpendicular to the track longitudinal direction, at least a part of the first portion one of any one of said first and second tracks on which first portion one of said first and second record position detecting signals is recorded is not farther from the track scanning start ends than one of the non-overlapping parts of the second portions of two adjacent tracks which non-overlapping part is nearer to the track scanning start ends as viewed in said direction perpendicular to the track longitudinal direction, one of said first and second tracking signals being recorded on said second portions;

scanning said first tracks to reproduce the recorded first record position detecting signal and to reproduce first and second crosstalk signals of the recorded second tracking signal from the two adjacent second tracks, and scanning said second tracks to reproduce the recorded second record position detecting signal and to reproduce third and fourth crosstalk signals of the recorded first tracking signal from the two adjacent first tracks; and detecting the difference of the levels between said first and second crosstalk signals with first timing based upon the reproduction of the recorded first record position detecting signal from said first tracks to generate a first tracking error signal, and detecting the difference of the levels between said third and fourth crosstalk signals with second timing based upon the reproduction of the recorded second record position detecting signal from said second tracks to generate a second tracking error signal, said first and second tracking error signals being alternately used for said first and second tracks to constitute said tracking control signal.

9. A method according to claim 8, in which said detection of the level differences between said first and second crosstalk signals and between said third and fourth crosstalk signals is performed by comparing said first and second crosstalk signals and said third and fourth crosstalk signals with said first and second timing, respectively.

10. A method according to claim 8, in which said detection of the level differences between said first and second crosstalk signals and between said third and fourth crosstalk signals is performed by mixing each of said first, second, third and fourth crosstalk signals with a local frequency signal having a frequency identical with the frequency of that one of said first and second tracking signals which is recorded on the track beinq scanned to generate first, second, third and fourth frequency difference signals and comparing said first and second frequency difference signals and said third and fourth frequency difference signals with said first and second timing, respectively.

11. A method according to claim 8, in which the frequencies of said first and second position detecting signals are equal to each other, the frequencies of said first and second tracking signals are different from each other, said first and second portions of each track are adjacent to each other and each of said first portions has a length equal to said predetermined displacement distance.

12. A method according to claim 11, in which a third tracking signal is further recorded on a third portion of each of said tracks, said third portion being nearer to the scanning start ends than said second portion as viewed in said direction perpendicular to the track longitudinal direction, being adjacent to said first portion and having a length equal to said predetermined displacement distance, the frequency of said third tracking signal being identical with that of said second tracking signal and that of said first tracking signal when the track being scanned is said first track and said second track, respectively, and in which said detection of the level differences between said first and second crosstalk signals and between said third and fourth crosstalk signals is performed by mixing each of said first, second, third and fourth crosstalk signals with a local frequency signal having a frequency identical with the frequency of said record position detecting signal to generate first, second, third and fourth frequency difference signals and comparing said first and second frequency difference signals and said third and fourth frequency difference signals with said first and second timing, respectively.

13. A method according to claim 8, in which a blanking signal is further recorded on each of portions adjacent to said first portion, between said first and second portions and adjacent to said second portion of each of said tracks, said blanking signal having such a high frequency as suffering from a large azimuth loss when reproduced by said heads.

14. A method according to claim 8, in which the second portion is nearer to the track scanning start ends than the first portion in said first tracks, and the first portion is nearer to the track scanning start ends than the second portion in said second tracks.

15. A method according to claim 8, in which the first portion is nearer to the track scanning start ends than the second portion in said first tracks, and the first portion is nearer to the track scanning start ends than the second portion in said second tracks.

16. A method according to claim 8, in which said first and second tracking signals have an identical frequency, and at least a part of the second portion of each of said first and second tracks does not overlap with the second portion of the two tracks which are adjacent thereto as viewed in said direction perpendicular to the track longitudinal direction.

17. A method according to claim 8, in which said first and second record position detecting signals have an identical frequency.

18. A method according to claim 8, in which the part of the first portion of any one track on which first portion one of said first and second record position detecting signals is recorded overlaps with that one of the non-overlapping parts of the second portions of the two adjacent tracks which non-overlapping part is nearer to the track scanning start ends as viewed in said direction perpendicular to the track longitudinal direction.

19. A rotary head type magnetic recording and reproducing apparatus comprising:
   a plurality of rotary heads mounted on rotary head carrying means and arranged for scanning parallel, oblique tracks of a magnetic tape for signal recording and reproduction with a predetermined displacement distance between the track scanning start ends of two adjacent tracks as measured in a direction perpendicular to the longitudinal direction of the tracks;
   means for driving said head carrying means;
   means for driving said magnetic tape;
   means for processing signals to be supplied to and from said head so that said signals are properly recorded on and reproduced from the tracks of said tape;
   means for generating a head position signal in synchronism with rotation of said rotary heads, said head position signal containing a plurality of scanning start pulses each representative of the time point when one of said head is located at the scanning start end of said tracks;
   signal source means capable of generating at least two different frequencies;
   means connected with said head position signal generating means for generating two first gate pulse signals starting, respectively, upon elapse of first and second time periods from scanning start pulses for each of a series of first tracks and second tracks, said first tracks being predetermined ones of said parallel, oblique tracks spaced from one another, said second tracks being other predetermined ones of said parallel, oblique track spaced from one another so as to be interleaved with said first tracks so that said first tracks are adjacent said second tracks;
   means connected with said first gate pulse signal generating means for generating a second gate pulse signal for said first tracks in a first timed relation with the associated one of said first gate pulse signals and for generating a third gate pulse signal for said second tracks in a second timed relation with the other one of said first gate pulse signals under control of said head position signal received from said head position signal generating means;
   selection means connected with said signal source means and with said first gate pulse signal generating means and said second and third gate pulse signal generating means to deliver first and second signals having first and second ones of said different frequencies of said signal source means during the width of said first gate pulse signals as first and second record position detecting signals, a third signal having a third one of said different frequencies during the width of said second gate pulse signal as a first tracking signal and a fourth signal having one of said different frequencies and being different from said first and second frequencies during the width of said gate pulse signal as a second tracking signal, said signal processing means being arranged to receive the output of said selection means for recording of said first record position detecting signal and said first tracking signal on said first tracks, and said second record position detecting signal and said second tracking signal on said second tracks of said magnetic tape through said magnetic heads and to receive from said heads and process reproduced signals containing information signals, record position detecting signals, tracking signals and crosstalk signals of the tracking signals; and
   tracking control circuit means interconnected between said signal processing means and either one of said magnetic tape drive means and said head carrying means drive means, said tracking control circuit means including
   (a) means connected with said signal processing means for extracting reproduced first and second record position detecting signals for the tracks from the processed reproduction output of said signal processing means,
   (b) means connected with said signal processing means for alternately producing first and second crosstalk detection signals from said second tracks and third and fourth crosstalk detection signals from first tracks on the basis of the crosstalks contained in the processed reproduction output of said signal processing means,
   (c) means connected with said reproduced first and second record position detecting signal extracting means for generating a sampling signal on the basis of said reproduced first and second record position detecting signals, and
   (d) means for alternately comparing said first and second crosstalk detection signals and said third and fourth crosstalk detection signals by the use of said sampling signal to produce a tracking control signal to be fed to either one of said drive means.

20. An apparatus according to claim 19, in which said crosstalk detection signal producing means is constituted by means for extracting reproduced crosstalk signals from the processed reproduction output of said signal processing means and delivering the extracted reproduced crosstalk signals to said comparing means as said crosstalk detection signals.

21. An apparatus according to claim 19, in which said crosstalk detection signal producing means includes a mixer in an electrical connection for receiving the processed reproduction output of said signal processing means and a local oscillation circuit capable of generating at least two different frequencies and arranged to successively and cyclically supply to said mixer local oscillation signals of said different frequencies under control of said head position signal received from said head position signal generating means so that said mixer serially produced frequency difference signals between said crosstalk signals in said processed reproduction output and the output of said local oscillation circuit and deliver said difference frequency signals to said comparing means as said crosstalk detection signals.

22. An apparatus according to claim 19, in which the frequency of said fourth signal is equal to that of said third signal in the output of said selection means.

23. An apparatus according to claim 19, in which the frequency of said fourth signal is also different from that of said third signal in the output of said selection means, said second and third gate pulse signal generating means is in such a structure and is in such an arrangement with respect to said first gate pulse generating means that said first gate pulse signal is followed by said second gate pulse signal without any time interval therebetween for said first tracks and is followed by said third pulse signal without any time interval therebetween for said second tracks.

24. An apparatus according to claim 23, in which:
said apparatus further comprises means connected between said head position signal generating means and said first gate pulse signal generating means for generating fourth and fifth gate pulse signals for said first and second tracks starting upon elapse of a second time period from each of said scanning start pulses and continues until said starting of said first gate pulse signal, said fourth and fifth gate pulse signals being also supplied to said selection means so that it delivers said fourth and third signals during the widths of said fourth and fifth gate pulse signals as third and fourth tracking signals, respectively;
said crosstalk detection signal producing means includes a mixer in an electrical connection for receiving the processed reproduction output of said signal processing means and a local oscillation circuit capable of generating a frequency equal to the frequency of one of said first and second record position detecting signals and arranged to supply to said mixer a local oscillation signal having frequency equal to said record position detecting signal frequency under control of said first gate pulse signal received from said first gate pulse signal generating means so that said mixer simultaneously produces two difference frequency signals between said crosstalk signals in said processed reproduction output and the output of said local oscillation circuit for each track and delivers said difference frequency signals to said comparing means as said crosstalk detection signals; and
said comparing means includes a comparator for comparing said two difference frequency signals and an inverter for reversing the output of said comparator under control of said head position signal received from said head position signal generating means to generate said tracking control signal.

25. An apparatus according to claim 19, in which the frequency of said fourth signal is also different from that of said third signal in the output of said selection means, said second and third gate pulse signal generating means is in such a structure and is in such an arrangement with respect to said first gate pulse generating means that said first gate signal is followed by said second gate pulse signal with a first time interval therebetween for said first tracks and is followed by said third pulse signal with a second time interval therebetween for said second tracks; and
said apparatus further comprises sixth gate pulse signal generating means interconnected between said head position signal generating means and said first gate pulse signal generating means, seventh gate pulse generating means interconnected between said first gate pulse signal generating means and said second and third gate pulse signal generating means and eighth gate pulse signal generating means interconnected between said second and third gate pulse signal generating means and said head carrying means drive means and comprises second signal source means capable of generating a blanking signal having such a high frequency that it suffers from a large azimuth loss when reproduced, after having been recorded on the tape, by the heads, all of the outputs of said sixth, seventh and eighth gate pulse signal generating means being also supplied to said selection means so that it delivers said blanking signal during the widths of said sixth, seventh and eighth gate pulse signals, respectively, the width of said seventh gate pulse signal alternately corresponding to said first and second time intervals for said first and second tracks.

* * * * *

UNITED STATES PATENT AND TRADEMARK OFFICE
CERTIFICATE OF CORRECTION

PATENT NO. : 4,843,493

DATED : Jun. 27, 1989

INVENTOR(S) : Furuhata et al.

It is certified that error appears in the above-identified patent and that said Letters Patent is hereby corrected as shown below:

Column 33

Line 58, delete "one" (first occurrence)

Signed and Sealed this

Thirty-first Day of March, 1992

Attest:

HARRY F. MANBECK, JR.

*Attesting Officer*  *Commissioner of Patents and Trademarks*